US006850843B2

United States Patent
Smith et al.

(10) Patent No.: US 6,850,843 B2
(45) Date of Patent: Feb. 1, 2005

(54) ACCIDENT EVIDENCE RECORDING METHOD

(75) Inventors: Robert E. Smith, Tucson, AZ (US); Jürgen Vogt, Toeging am Inn (DE)

(73) Assignee: WDT Technologies, Inc., Tucson, AZ (US)

( * ) Notice: Subject to any disclaimer, the term of this patent is extended or adjusted under 35 U.S.C. 154(b) by 140 days.

(21) Appl. No.: 10/234,814

(22) Filed: Sep. 4, 2002

(65) Prior Publication Data

US 2003/0046003 A1 Mar. 6, 2003

Related U.S. Application Data

(60) Provisional application No. 60/317,713, filed on Sep. 6, 2001.

(51) Int. Cl.[7] .............................................. G01C 21/26
(52) U.S. Cl. ...................................... 701/213; 701/207
(58) Field of Search ................................ 701/200–213, 701/216, 35, 36; 33/556, 557, 553, 554, 555, 559; 356/3.01, 3.05, 622; 702/150, 155, 159, 28, 29; 340/815.69, 438, 439

(56) References Cited

U.S. PATENT DOCUMENTS

| | | | | |
|---|---|---|---|---|
| 6,141,611 A | * | 10/2000 | Mackey et al. | 701/35 |
| 6,493,650 B1 | * | 12/2002 | Rodgers et al. | 702/150 |
| 6,662,103 B1 | * | 12/2003 | Skolnick et al. | 701/207 |

OTHER PUBLICATIONS

"Technische Analyse von Verkehrsunfällen"; Danner/Halm; Eurotax AG 1994, ISBN 3–9520040–5–7 (*title engl. transl.: Technical Analysis of Motor Vehicle Accidents*), pp. 405–433.

"Definition and Delaunay Properties", which is described at the following web site: www.iue.tuwien.ac.at/publications/phd%20theses/fleischmann/node43.html., pp. 1–4.

"Development of a Low Cost System for the Automated Documentation of Crash Scenes Using GPS (autoDOCS–GPS)" by Charles Rogers and Darrell Greenlee, Jan. 25–27, 1999, pp. 369–376.

"Performance of A Low Cost System for Automated Documentation of Crash Scenes Using GPS (AutoDOCS–GPS)" by Charles Rogers et al., ION GPS 2001, Sep. 11–14, 2001, pp. 509–516.

* cited by examiner

*Primary Examiner*—Richard M. Camby
(74) *Attorney, Agent, or Firm*—Cahill, von Hellens & Glazer, P.L.C.

(57) ABSTRACT

A mobile accident recording system (40) includes a GPS receiver-pole (41) and a computer (14) which prompts investigator to place a tip of the receiver-pole on identified position points of evidence items at an accident site to measure and record coordinates of the position points. Data including the recorded coordinates and stored database information for each evidence item are processed to reconstruct a graphical three-dimensional representation of the accident site which is displayed to the investigator from any desired advantage point selected by the investigator.

52 Claims, 13 Drawing Sheets

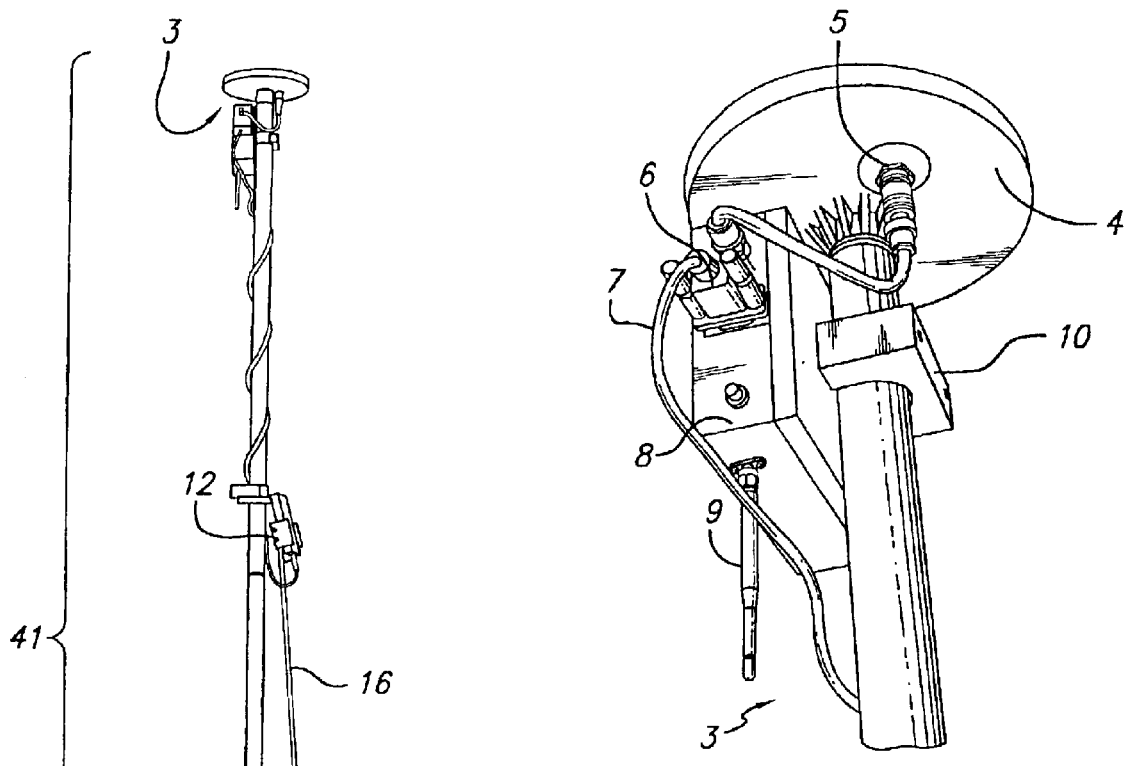
FIG. 1A
FIG. 1B
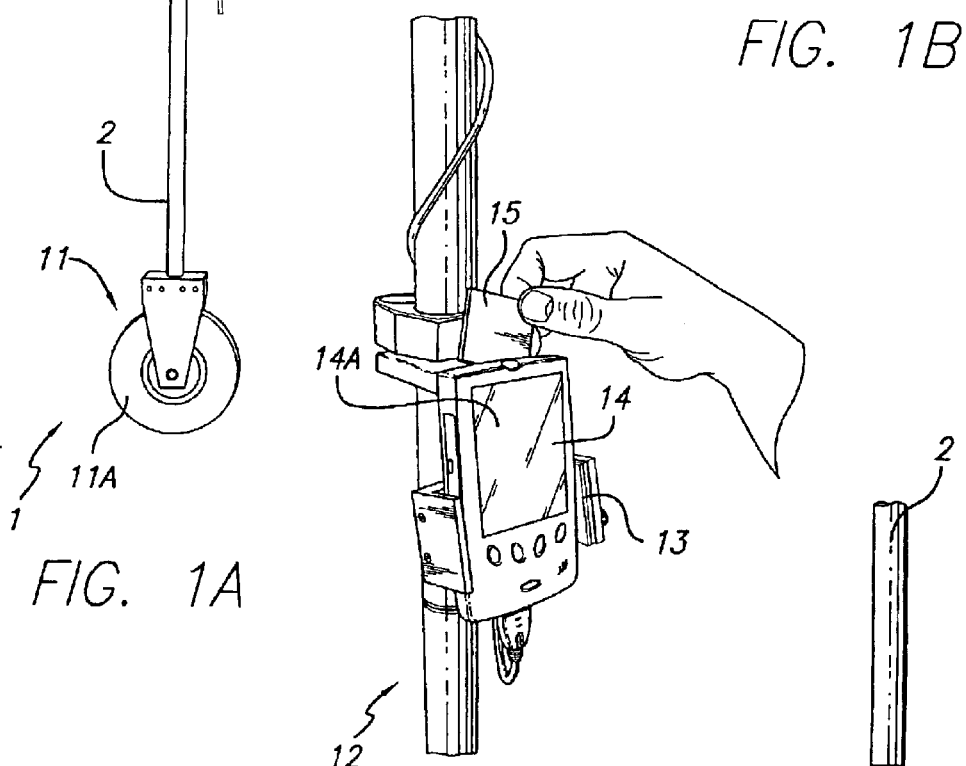
FIG. 1C
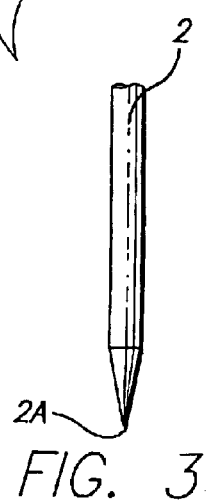
FIG. 3

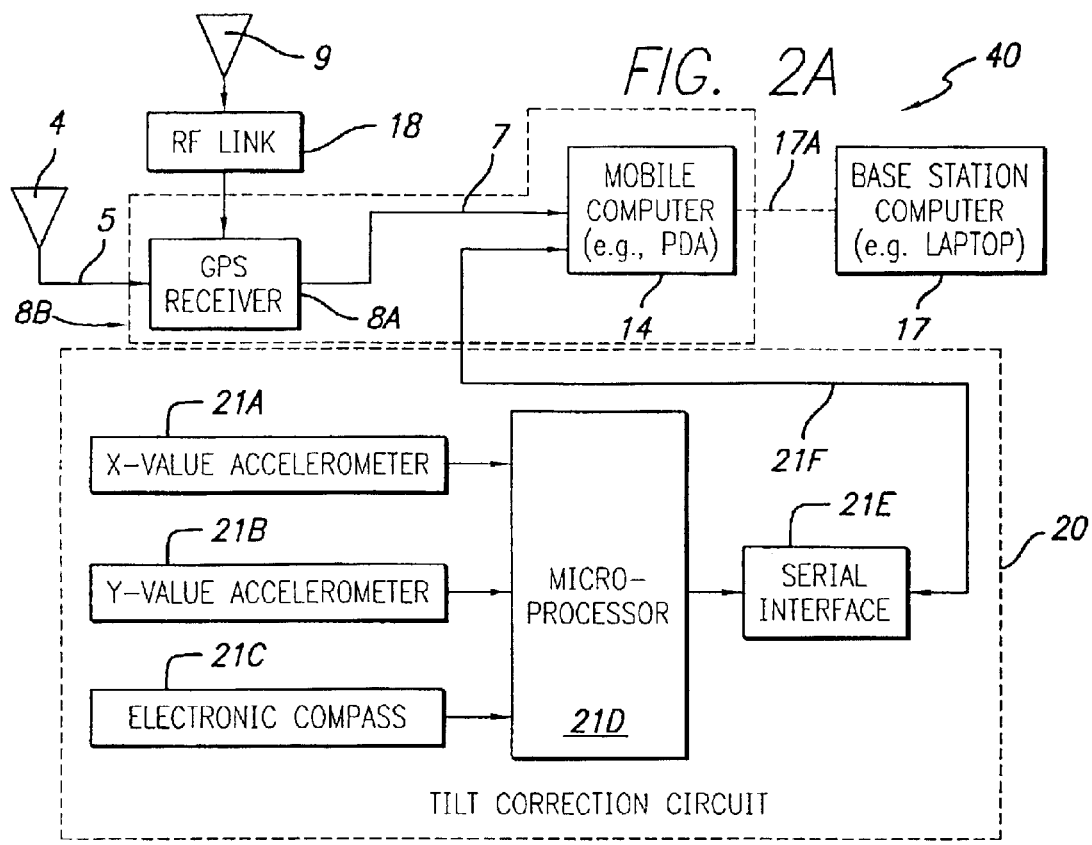
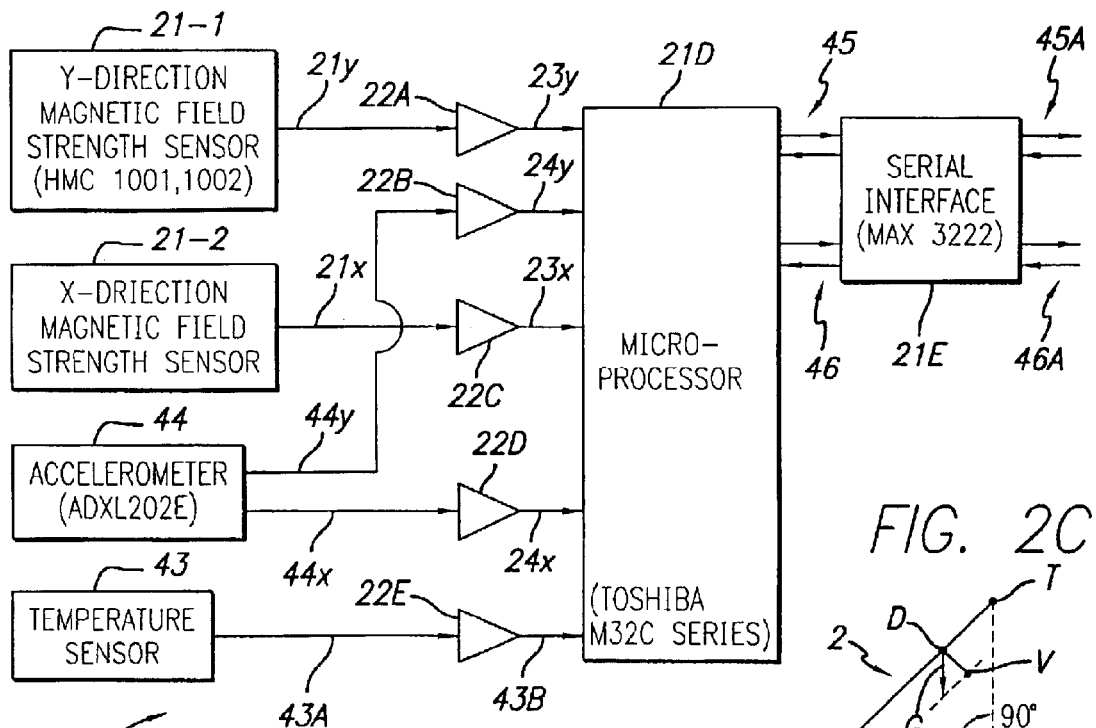
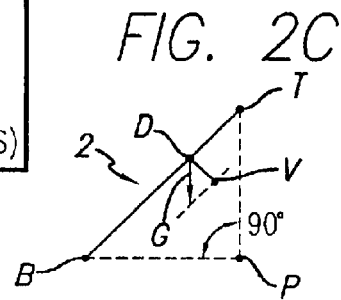

ACCIDENT EVIDENCE RECORDING METHOD

CROSS REFERENCE TO RELATED APPLICATION

This application claims the benefit of prior filed U.S. provisional application Ser. No. 60/317,713 filed Sep. 6, 2001, now abandoned entitled "ACCIDENT EVIDENCE RECORDING METHOD" by Robert E. Smith.

BACKGROUND OF THE INVENTION

The present invention relates generally to systems and methods for precisely and rapidly recording/documenting conditions of relevant evidence at the site of an accident, including accurately recording the locations and conditions of evidence items at the site as soon as possible after the occurrence of the accident. The invention also relates to systems and methods for effectively displaying the recorded/documented evidence at the accident site from various desirable vantage points, and to ways of effectively and reliably utilizing the evidence to draw accurate factual conclusions and legal conclusions to assist in determination of legal liability for the accident.

By way of background, the volume of traffic in industrialized countries has reached levels that lead to time-costing traffic jams that may be caused by even the slightest traffic irregularities. Although an accident happens in a few seconds, making an accident report involves a great deal of time, sometimes several hours or more. The police often are legally obliged to collect accurate information, ordinarily using measuring tapes, pens and paper, to assist in determining legal liability for the accident. To this end, much has to be considered and nothing should be omitted or forgotten in the evidence measurement and recording/documentation process.

Initially, a base point for all measurements must be determined so that all distances and angles can be accurately recorded. In addition, the locations and orientations of involved vehicles, persons (including bystanders), animals, structures, features of the road, and numerous other involved items and the conditions thereof must be measured and/or recorded immediately after the accident. Any tire skid marks must be precisely located, measured and recorded. In order to accurately reconstruct the accident later on, the road and weather conditions and a multitude of other important items also must be noted.

In many countries, the law requires that a sketch or drawing of the accident site be made. In cases of personal injury, making measurements and gathering of other important data must be performed by a competent and legally recognized expert. The resulting sketch or drawing ordinarily needs to be a "work of art" that can be used as a legal document that is difficult to effectively challenge in court. Even if the sketch or drawing varies from the actual accident site, the imagination of the artist who creates such a "work of art" can impart to the sketch or drawing the basis for a legal decision regarding paying or not paying a sum of money that can amount to millions of dollars.

Consequently, it is the responsibility of every investigator who prepares an accident report to be very accurate in describing and measuring every trace and piece of evidence involved in the accident. At the present state-of-the-art, the tools being used to record/document the evidence immediately after the accident usually are incapable of providing the completeness and accuracy needed to adequately describe and the present the evidence. The methods currently in use for taking measurements at accident sites can be divided into the following groups:

1. The known on-site "Distance/Angle Measuring Method" is described in "Technische Analyse von Verkehrsunfällen"; Danner/Halm; Eurotax AG 1994, ISBN 3-9520040-5-7 (title engl. transl.: *Technical Analysis of Motor Vehicle Accidents*) which also includes the sub-variations "Triangular Measuring Method", "Right Angle—Coordinates Method" and the "Chord—Height Measurement". According to this reference, distances are measured from a centered, fixed point to the various items on the site. There are different applications in use, but all of them go back to the basic idea, wherein distance is measured from a certain point to another and the angle is determined. Later these measurements are transferred and recalculated into real two-dimensional drawings. The angle is measured using a special apparatus to determine the angle by taking aim at the item with a notch. The described method is very insecure, and failures are not detected until the end of the day. Furthermore, it is impossible to add measurements later to the original sketch.

2. Another known on-site measuring method is described in "Lasergestützte Vermessung von Unfallstellen"; Verkehrsunfall—und Fahrzeugtechnik; Kardelke, Diederichsen, Laicher; 05/1998; pg. 151 ff; Verlag information, Kippenheim (title eng. transl.: *Laser-assisted Measuring of Accident Sites*). This laser-assisted method is based on triangulation using laser to measure distances. The procedure disclosed in this reference is generally as shown and described above, except for the fact that angle and distance measurement is performed electronically using a laser or other optical tools like a theodolit (e.g. Total Station), which is commonly used for surveying landscapes. The disadvantage of the procedure disclosed by this reference is that one static position is used and that there is a need for a second person to hold the reflector. Furthermore, most marks behind walls or even cars (e.g., positions of persons, traffic signs etc.) cannot be measured from that point. Measuring skid marks or other marks on the road is difficult. The traffic area has to be closed for traffic during measurement and the damaged cars have to be moved away. The usability of the system during night, rain and snow is limited.

3. The "Photographic Method", also described in "Technische Analyse von Verkehrsunfällen"; Danner/Halm; Eurotax AG 1994, ISBN 3-9520040-5-7 (title engl. transl.: *Technical Analysis of Motor Vehicle Accidents*), differs from the above methods (1) and (2) in that it does not call for on-site measurements. This method derives its measurements from the analysis of photographs taken with a stereo camera (3-D method). The known Video-assisted Accident and Traffic Documentation System from DE 199 52 832 A1 also is in the group of "Photographic Methods". This method disclosed in this reference uses reference objects placed on the road to measure distances and angles based on pictures or videos of accident scene. A disadvantage of this technique is that a large amount of time and a large amount of power is needed to analyze these pictures. The user needs to find a way of taking a photograph from a high elevation, with all relevant items at the accident scene appearing in the photograph. Usually, there is no opportunity to perform any analysis or obtain any result thereof while the user is still at the accident site, so all analysis is performed off site. This will cause a situation wherein the analysis shows that important marks cannot be measured when items at the site are gone.

The foregoing recognized methods for recording accident sites have the disadvantage that although the methodology of each individual analysis may be very accurate, any factual and legal conclusions based on the analysis nevertheless may be incorrect because they are based on measurements that include a very large margin of error.

It obviously is crucial that measurements and locations of evidence at the site of an accident be accurate if conclusions based on an analysis which in turn is based on the locations and measurements are to be accurate. However, measuring of all three coordinates (x,y,z) of a point is only possible with considerable effort, and then only with large (e.g., greater than 10%) inaccuracies. The successful recording of an accident site with accurate and exact measurements is strongly dependent upon the investigator making the measurements and the extent of her/his technical knowledge. If all evidence of the accident is not completely and accurately recorded initially, usually it will not be possible to do so later because the original evidence as it existed immediately after the accident is no longer available.

It is well known that GPS receivers are commonly used as navigational aids on ships, airplanes, and more recently in motor vehicles. A GPS receiver device receives information transmitted from three or more GPS satellites and therefore can calculate its own exact location in 3 dimensions, based on the position of a GPS receiver relative to the satellites and on the transmission times of the received signals. Using standard GPS technology, the resulting accuracy of the measured absolute location of the GPS receiver is precise to within a few centimeters.

Some prior systems for recording information at an accident site in some instances use GPS data to identify locations of accidents. However, GPS techniques have not previously been used to provide measurement of the coordinates of certain points on the vehicles and other items involved in an accident, configurations of damage caused by the accident to vehicles and/or other property, locations and dimensions of tire skid marks and/or other disturbances caused by the accident, etc. This is at least partly because prior GPS solutions are much too expensive. The average cost of such a GPS measuring system consisting of a stand-alone GPS Base station and a mobile station would be roughly $ 40,000 to $50,000. The user must have detailed knowledge of the GPS system and how to measure GPS points. At the present state-of-the-art, only experts in GPS measurements are able to perform these measurements. Because of the format of the GPS data, special software is necessary to convert the GPS data into coordinates that can be used to measure features of roads and other traffic items.

The closest prior art is believed to be indicated in the publication "Development of a Low Cost System for the Automated Documentation of Crash Scenes Using GPS (autoDOCS-GPS)" by Charles Rogers and Darrell Greenlee of Optimus Corporation, presented Jan. 25–27, 1999 at the at The Institute of Navigation (ION) National Technical Meeting conference, Session C1, located at the Catamaran Resort Hotel, San Diego, Calif. The publication describes a system that utilizes a GPS antenna mounted on a survey stake tripod. The antenna is coupled to a GPS receiver, which in turn is coupled to a laptop computer containing software that performs functions of accident scene data collection, post processing of the acquired data into a commercially available CAD package MS Visio™, and report generation using MS WORD.

This prior art system has shortcomings that include using low-cost GPS receivers with poor position accuracies requiring use of Kalman filtering techniques that are used to determine average optimum position solutions with noisy input data and which do not provide a real absolute position accuracy. All measured GPS data must be combined with GPS reference data after leaving the accident site, and then the combined data is post-processed. This procedure does not allow an immediate on-scene check to determine validity of the accident scene measurements. All related software packages are commercially available off-the-shelf products which will accept measured GPS data and are limited in their application to accident documentation. Every measurement has to be made one point at a time, requiring approximately 5 seconds at each measurement point before moving to the next point. Every measurement has to be made by manually setting a tripod mounted pole with associated electronics and manually adjusting the pole to a vertical position with a level. This method results in large measurement errors, and the measurement pole and electronics cannot be accurately used to measure points above ground level.

Thus, there is an unmet need for a system and method for more quickly, accurately, and inexpensively obtaining location, orientation, and dimensional information of evidence items at an accident site so as to enable much more reliable factual conclusions and legal conclusions to be drawn regarding the occurrence of the accident than previously has been possible.

There also is an unmet need for a system and method for more quickly, accurately, and inexpensively displaying and/or presenting location, orientation, and dimensional information of evidence items at an accident site so as to enable much more reliable factual conclusions and legal conclusions to be drawn regarding the occurrence of the accident than previously has been possible.

There also is an unmet need for a system and method that facilitates a return to the accident site and accurately reproduces, with accuracy to within a few centimeters, the locations of objects, vehicles, people, skid marks, signs, etc. that were present at the time of the accident.

SUMMARY OF THE INVENTION

Accordingly, it is an object of the invention to provide a system and method for improving the accuracy of coordinates measured using a GPS system.

It is an object of the invention to provide a system and method for more quickly and accurately obtaining location and dimension information of evidence items at accident site so as to enable much more reliable factual and conclusions legal conclusions to be drawn regarding the occurrence of the accident than previously has been possible.

It is an object of the invention to provide a system and method for more quickly and accurately displaying and/or presenting location and dimension information of evidence items at accident site so as to enable much more reliable factual conclusions and legal conclusions to be drawn regarding the occurrence of the accident than previously has been possible.

Briefly described, and in accordance with one embodiment, the present invention provides a system for receiving and recording data representing three-dimensional coordinates of selected points of objects at an accident site, including a GPS device including a receiver (8A), a computer (14) coupled to the receiver, and a prompting program stored in the computer (14) for causing a module (14A) associated with the computer to prompt a user to sequentially position a portion of the GPS device in close spatial relationship with a plurality of points of each of a plurality of items or features at the accident site and to cause corresponding GPS coordinate data produced by the GPS device to be stored in a memory (15) associated with the computer (14).

In the described embodiment, the mobile accident recording system includes a GPS unit (3), a first computer (14) and a link coupling the first computer (14) to the GPS unit, and a prompting program stored in the first computer (14) for causing a display (14A) associated with the computer to prompt a user to sequentially position the GPS unit (3) in close spatial relationship with a plurality of points of each of a plurality of items or features at the accident site and to cause GPS coordinate data produced by the GPS unit to be stored in a memory (15) associated with the first computer (14).

In the described embodiment, a pole (2) supporting the GPS receiver unit (3), the first computer (14) is supported by the pole, and a direct link or wireless link couples the first computer (14) to the GPS receiver unit. A tilt correction system is attached in fixed relation to the pole for producing correction signals representative of tilt of the pole relative to the direction of gravitational force at the accident site and correcting the GPS signals produced by the GPS receiver unit (3) to produce x,y,z coordinates signals that precisely represent the location of a tracking point at the bottom of the pole when the tracking point is positioned in close spatial relationship with the plurality of points, respectively.

In the described embodiment, a second computer (17) stores a library of data representing realistic graphic images of various items and features at the accident site. The second computer (17) also executes an accident scene reconstruction program that generates a realistic graphic replica of the accident scene from the stored GPS data and corresponding selected graphic images retrieved from the library data. The second computer (17) also executes a perspective selection program to produce the realistic graphic representation of the accident site from a selected vantage point in a selected direction.

In the described embodiment, the pole has a pointed tip at its lower end for touching points to the measured, and a wheel assembly can be attached to the lower end of the pole for rolling along marks or features to the measured on the ground or road. A recalibration program is executed whenever the wheel assembly is attached or removed to compensate for the change in the effective length of the pole.

In one embodiment, the invention provides a tilt correction system for converting coordinate data produced by a GPS unit (3) an antenna (4) of which is supported on an upper portion of a pole (2), including a tilt sensor attached in fixed relation to the pole (2), the sensor producing correction signals representative of tilt of the pole (2) relative to the direction of gravitational force, and a computing device coupled to receive the correction signals from the tilt sensor and signals representing the coordinate data produced by the GPS unit (3), the computing device being operative to correct the coordinate data in response to the correction signals. The tilt sensor includes an accelerometer system (21A,B) and an electronic compass (21C) for producing signals representative of the inclination of the pole (2) in two directions relative to the gravitational force. The accelerometer system is a dual axis accelerometer system.

BRIEF DESCRIPTION OF THE DRAWINGS

FIG. 1A is a diagram of a mobile accident recording system of the present invention.

FIG. 1B is an enlarged view of the GPS unit 3 in FIG. 1A.

FIG. 1C is an enlarged view of the computer 14 shown in FIG. 1A.

FIG. 2A is a diagram of the electrical components of the mobile accident recording system of FIG. 1.

FIG. 2B is a diagram of the tilt correction circuitry in the mobile accident recording system of FIG. 2A.

FIG. 2C is a diagram useful in explaining the formulas for tilt correction.

FIG. 3 shows a pointed lower end of the pole 2 in FIG. 1A for measuring the x,y,z coordinates of a single point of item at accident scene.

DETAILED DESCRIPTION OF THE PREFERRED EMBODIMENTS

Figure 4A:
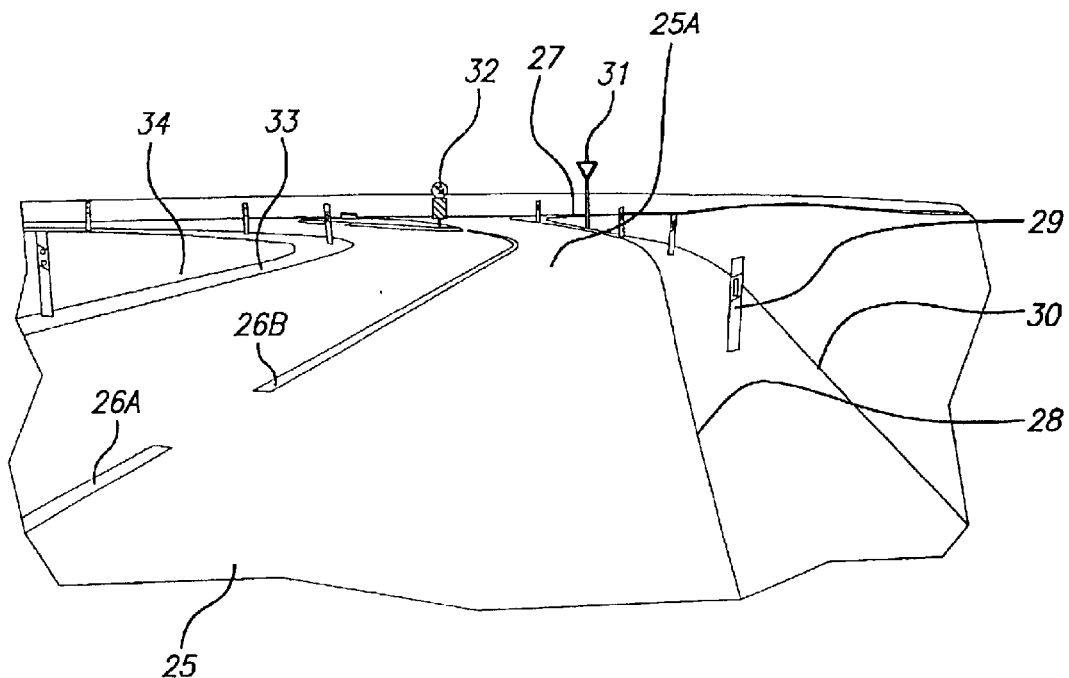
FIG. 4A is a perspective view of a typical accident site in which the mobile accident recording system of FIG. 1 can be utilized.

Referring to FIGS. 1A–C, 2A–B and 3, a GPS (global positioning system) unit 3 is used in a mobile accident recording system (MARS) 40 (FIG. 2A) of the present invention to measure and record the locations of evidence items involved in an accident. The mobile accident recording system 40 includes a GPS receiver-pole 41 including a six-foot pole 2 having GPS unit 3 including a GPS receiver 8A and tilt correction circuitry 20 included in an "electronics box" 8 that can be attached to the upper end of pole 2, an assembly 12 including a computer 14 having a screen 14A attached by a bracket 13 to a mid-portion of pole 2, and either a pointed lower end 2A or a removable wheel assembly 11 including a wheel 11A on the lower end of pole 2. The pointed lower end 2A of pole 2 can be slid into and be secured to wheel assembly 11, if needed. A software calibration routine prompts investigator to attach wheel assembly 11 whenever this is necessary, and also prompts the investigator to take an additional GPS measurement with wheel assembly 11 attached and wheel 11A on the ground, and then uses the results of that measurement to recalibrate GPS receiver-pole 41 for use with wheel 11A rolling on the feature(s) to be measured next.

GPS unit 3 is operatively coupled to computer 14, for example, by a cable or a conventional Bluetooth wireless communication link, to receive tilt-corrected data produced by GPS unit 3. Computer 14 can be a PDA (personal digital assistant) such as a Compaq model IPAQ 3850 available from Hewlett-Packard, a laptop computer, a pen pad computer, or the like. Computer 14 can be coupled to a "base station" computer 17 by a cable or wireless communication link 17A or a removable memory card 15. Computer 17 can be any suitable computer such as a laptop or a desktop computer. A wireless communications link between computers 14 and 17 can be accomplished by means of the above mentioned Bluetooth system.

However, and by way of definition, it is to be understood that a conventional GPS receiver such as GPS receiver 8A in FIG. 2A itself includes a computer, usually an embedded microprocessor or microcomputer, that computes the "raw" three-dimensional GPS coordinates produced by the GPS receiver. If that embedded microprocessor or microcomputer is sufficiently powerful and suitably programmed, it can perform all of the functions of both GPS receiver 8A and computer 14. One embodiment of the present invention includes a mobile accident recording system in which computer 14 is, in effect, combined as part of the embedded microprocessor/microcomputer of the GPS receiver 8A. Dashed line 8B designates a GPS receiver in which some or all of the functions of mobile computer 14 and the computing function inherently required in the GPS receiver are integrated into a single microprocessor/microcomputer that is considered to be part of the GPS receiver.

A second antenna 9 is coupled by means of any suitable RF link 18 to provide a differential correction signal to a GPS differential correction input port of GPS receiver 8A. The differential correction signal can be easily obtained from various sources, such as any of a large number of government-installed GPS differential reference base stations. RF link 18 can be a digital receiver and a UHF modem, and can be included in electronics box 8. Alternatively, RF link 18 and antenna 9 can be a conventional digital cell phone and its antenna.

Note, however, that although pole 2 or an equivalent thereof provides a convenient means of supporting GPS unit 3 and computer 14 during the procedure of measuring coordinates of items at the accident site, pole 2 is not essential to all embodiments of the invention.

In FIG. 1B, reference numeral 4 designates a conventional GPS antenna, reference numeral 5 designates the cable connection between the antenna 4 and the GPS receiver 8A, reference numeral 6 designates the connector to the GPS receiver 8A, all of which are included in GPS unit 3. Cable 7 extends from the receiver 8A in electronic box 6 to PDA computer 14. Reference numeral 8 designates a power switch, reference numeral 9 designates an antenna of a UHF modem link to the base station in a police vehicle, and reference numeral 10 designates a mounting element, all of which are also included in GPS unit 3. Referring to FIG. 1C, assembly 12 includes a bracket 13 supporting a PDA 14 (which is used as computer 14) including a display screen 14A and a conventional memory card 15.

The measured, tilt-corrected three-dimensional x,y,z coordinate data produced by GPS unit 3 and tilt correction hardware 20 shown in FIG. 2B. The tilt-corrected coordinate data is referred to herein simply as GPS data, and can be stored in a conventional memory card 15 when it is plugged into computer 14. The stored GPS data then can be transferred via a wireless link to computer 17, or memory card 15 can be unplugged from computer 14 after the accident site data has been entered and then plugged into a PCMCIA port of computer 17.

As indicated in FIG. 2A, GPS receiver-pole 41 includes antenna 4, GPS receiver 8 connected to antenna 4 and producing three-dimensional GPS coordinate data on cable 7 coupled as input to "mobile" computer 14 attached to pole 2, and also includes tilt correction circuit 20. Tilt correction circuit 20 includes an x-value accelerometer 21A, a y-value accelerometer 21B, and an electronic compass 21C, all of which are conventional devices. X-value accelerometer 21A, y-value accelerometer 21B, and electronic compass 21C produce signals which are provided as inputs to a microprocessor 21D which calculates the correction signals required to compensate the GPS data produced by GPS receiver 8 for the tilt of pole 2, and supplies the correction signals via a serial interface 21E as another input to computer 14. Computer 14 then uses the correction signals to automatically correct the x,y,z coordinate data points produced by GPS receiver 8 for the amount of tilt of the six-foot pole 2, for up to 20 degrees of tilt in any direction with respect to vertical. "Base station" computer 17 is coupled to computer 14 by a suitable communications link 17A.

FIG. 2B shows more detail of tilt correction circuit 20. The electronic compass 21C of FIG. 2A includes a y-direction magnetic field strength sensor 21-1 which measures the y component of the local magnetic field of the earth, and produces an analog signal 21y as an analog input to an amplifier 22A. Amplifier 22A produces a corresponding analog output signal 23y as an input to microprocessor 21D, which can be a Toshiba M32C series microprocessor having both analog input ports and serial digital output ports. Electronic compass 21C also includes an x-direction magnetic field strength sensor 21-2 which measures the x component of the local magnetic field of the earth, and produces an analog signal 21x as an analog input to an amplifier 22C. Amplifier 22C produces a corresponding analog output signal 23x as an input to microprocessor 21D. Magnetic field strength sensors 21-1 and 21-2 together constitute a dual-axis magneto resistive sensor that serves as an electronic compass to measure geographic direction, and can be implemented by means of HMC 1001 and HMC 1002 magnetic field strength sensors, which are available from Honeywell Corporation.

x-value accelerometer 21A and y-value accelerometer 21B of FIG. 2A can be implemented by means of an accelerometer 44, which can be a model ADXL202E available from Analog Devices Inc. Accelerometer 44 produces a y-direction analog output signal 44y which is provided as an input to an amplifier 22B, which produces a corresponding output signal 24y as an input to microprocessor 21D. Accelerometer 44 also produces an x-direction analog output signal 44x which is provided as an input to an amplifier 22D, which produces a corresponding output signal 24x as another input to microprocessor 21D. The signals 23y and 24y represent the y-inclination of pole 2 relative to the local gravitational vector G shown in FIG. 2C, and the signals 23x and 24x represent the x-inclination of pole 2 relative to the gravitational vector G. A temperature sensor 43 produces an analog output signal 43A which is provided as an input to an amplifier 22E, which produces a corresponding output signal 43B as another input to microprocessor 21D. Microprocessor 21D converts the foregoing analog input signals to digital values and computes the digital y-direction correction signals 45 and the digital x-direction correction signals 46, compensated for temperature, which are needed to correct the coordinate data produced by GPS receiver 8 for the tilt of pole 2 relative to the gravitational vector G and transmits this information via serial interface 21E to computer 14. Computer 14 then uses this information to correct the un-corrected GPS data received via cable 7 from GPS receiver 8.

Tilt correction circuitry 20 has its own rectangular coordinate system with x and y axes. This coordinate system is the same for the inclination sensor and for the electronic compass. If the pole is tilted, the inclination sensor indicates the angle of the gravitation vector in the x and the y directions. Since the length of pole 2 is known exactly, the absolute values of the x deviation and the y deviation are easily calculated by multiplying the measured "G values" of the accelerometer-sensor with a constant value. The accelerometer output is calibrated to the gravitational force g, so its output is the vertical projection of the gravitation vector on its measurement axis. The measured deviation is $$BP=DV*C=\text{(accelerometer-output in } G\text{-force)}*(\{\text{length of the pole in meters}\}/1G\text{-force)},$$

where BP is the distance between the base of pole 2 and the point of the ground exactly under the top of pole 2, and DV is the distance between the position of the accelerometer and the vertical projection of the gravitation vector on the measurement axis of the accelerometer, and C is a constant. These distances are illustrated in the diagram of FIG. 2C.

It can be shown that this result is also valid for the other orthogonal measurement-axis and for all combination (summations) of vector components. Furthermore, $$x=(\{\text{length of the pole in meters}\}/1g)\times[\text{accelerator-x-output in "G values"}]$$

and $$y=(\{\text{length of the pole in meters}\}/1g)\times[\text{accelerator-y-output in "G values"}].$$

The absolute values of the x deviation and y deviation are then calculated, but the orientation of the cartesian coordinate system of the accelerometer does not usually correspond to the geographic coordinate system of the map, so the geographic direction of the deviation has to be measured. In order to determine the direction of the deviation, the orientation of the accelerometer to the geographic north has to be measured. To achieve this, the magnetic field of the earth is measured by a dual-axis magneto resistive sensor, which is placed in the same orientation as the accelerator.

The magneto resistive sensor gives two output values, magnetic field-strength in the x direction and magnetic field-strength in the y direction. By combining this information in an orthogonal-to-polar transformation, the orientation of the accelerometer to the geographic north is calculated. The true orientation to the north can only be calculated by consideration of the magnetic declination (d [°]). Note that the valid declination can be obtained from any actual map of the geographic region, where the system is used.

The true orientation-angle is $$\alpha_{xy}=\alpha_{meas}+d[°]$$

To obtain the x(east)- and y(north)-deviation in the geographic map, a coordinate-transformation has to be performed.

The deviation is $$\Delta x_{east}=\cos\alpha_{xy}*\Delta x-\sin\alpha_{xy}*\Delta y$$

$$\Delta y_{north}=\sin\alpha_{xy}*\Delta x+\cos\alpha_{xy}*\Delta y.$$

The deviation in the z direction is computed in a similar manner. With knowledge of the mounting height of the tilt correction circuit, the z direction is calculated in quite the same way. In other applications, the described tilt correction circuit can be mounted directly onto a machine or equipment.

Note, however, that tilt correction of the raw GPS data is not essential in all embodiments of the invention. If the GPS unit is maintained precisely oriented and/or if it is positioned very close to the point to be measured, and the GPS data may be sufficiently accurate without tilt correction.

When an investigator arrives at the site of an accident with the GPS receiver-pole 41, he/she begins the data recording process by measuring the x,y,z coordinates of a first position point of a first item as indicated by a prompting screen displayed by the computer 14.

Measurement of a position point is accomplished by holding GPS receiver-pole 41 vertically so its bottom point 2A or wheel 11A is immediately above or directly on the position point. Entry/recording of the position point or points is accomplished by selecting one of two modes, a "detailed mode" if bottom point 2A is to be used, or a "continuous mode" if wheel 11A is to be used.

In the detailed mode, the investigator confirms every measurement point that is to be added to the accident data file. The detailed mode is most useful in measuring the x,y,z coordinates of designated individual points of small items at the accident site, bringing the pointed tip 2A at the bottom of pole 2 directly to the point to be measured.

In the continuous mode, the mobile accident recording system 40 detects when the wheel of wheel assembly 11 is rolling on a feature to be measured, and automatically measures coordinates of the point presently contacted by the bottom of the wheel 11A of wheel assembly 11, corrects the coordinates for tilt error, and stores the tilt-corrected x,y,z coordinates of that point in the accident data file. Movement of wheel 11A is recognized by the system through the resulting change in coordinates produced by GPS receiver unit 3, although a tilting movement of the pole 2 only will not result in the change in the tilt-corrected GPS data and character, because the tilt correction circuit will automatically make a required correction.

An edit field can be selected for any particular coordinate data field by means of a command, either by pressing the OK button or making a menu selection. The investigator then can input additional information corresponding to the mark/feature being measured and store it into the present coordinate data field. All such additional information is stored together with the corresponding measured GPS coordinate data. Also, data is stored with a digital signature that protects the data against manipulation or misuse.

If the first item indicated by the prompting display of computer 14 is, for example, a bicycle, the prompting display shows a graphic diagram of a bicycle and sequentially identifies the two axle hubs and handlebar, one at a time, as the next position point is to be measured. Specifically, the required position points of the selected evidence item are shown diagrammatically on the display of computer 14 and are highlighted in the order in which they are to be measured by the investigator. In this way, the investigator is sequentially guided to each position point at which the lower point 2A of GPS receiver-pole is to be held in order to measure the x,y,z coordinate of that position point. The resulting x,y,z coordinate data then is entered/recorded/written into memory card 15.

When the recording of all position points relating to a particular item is completed, the investigator is automatically prompted by the display screen of computer 14 to measure and enter the indicated position points of the next item of evidence.

Computer 14 stores simplified two-dimensional graphic symbols that correspond to each item or feature that the investigator is prompted to measure with GPS receiver-pole 41. Computer 14 displays, on a real-time basis, the corresponding two-dimensional graphic symbol for each "prompted" item or feature as soon as the investigator completes the measurement thereof and stores its tilt-corrected coordinates in memory 15. The two-dimensional graphic symbol is displayed at the precise location of the measured and stored tilt-corrected GPS coordinates of the corresponding item or feature. This allows the investigator to easily recognize when all needed items or features at the accident site have been properly measured and recorded in memory 15.

Figure 4B:
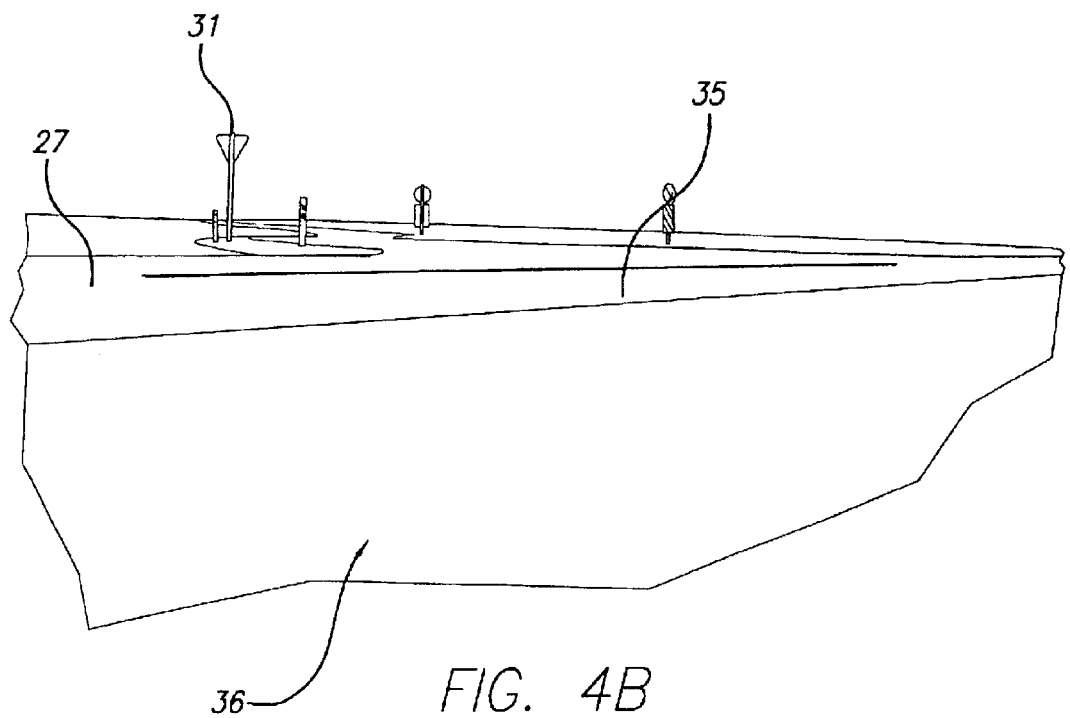
FIG. 4B is another perspective view of the same accident site shown in FIG. 4A.

FIG. 4A shows a simplified representation of a camera view of an accident scene, including a straight section of highway pavement 25 having a right edge 28 and left edge 33 expanding to the beginning of a curve 25A. A right shoulder 29 extends between pavement edge 28 and an edge 30 of a grassy area. A triangular traffic sign 31 and a variety of other traffic markers such as milepost 29 appear in the view. In this case, the mileposts are automatically added by the software, following the rules as to where such mileposts should be located. The mileposts can be measured, and then they are identified by their positions in the view. Painted highway lines 26A and 26B are present on pavement 25. FIG. 4B illustrates a simplified representation of another camera view of the same scene, taken from the opposite side of triangular traffic sign 31, wherein another section of pavement 27 intersects paved section 25 shown in FIG. 4A. An embankment 36 is present along the edge 35 of paved section 27.

As subsequently explained with reference to the program flow chart of FIGS. 7A and 7B, the display 14A of computer 14 prompts the investigator to follow a predetermined routine to make exactly the required measurements for the accident site using GPS receiver-pole 41. The immediate basic graphic picture of the accident scene can be displayed on the PDA for a quick real-time check that all scene elements have been measured. Then the data can be downloaded to computer 17 to allow a much more realistic three-dimensional graphic representation of the accident scene to be reconstructed.

Furthermore, items of evidence which already have had their identified position points measured and stored at any point in the overall measuring/recording process can be used to "reconstruct" a graphic diagram of the accident site as it appeared immediately after the accident. To accomplish this, each recorded item of evidence is displayed on computer 17 as a schematic three-dimensional presentation in its actual measured relationship to the accident site if the representative data and corresponding previously stored library data are available in computer 17. Thus, graphic representations of all recorded items of evidence can be visually examined on the display of computer 17 to ensure that all accident evidence items have been measured and recorded before the accident site is released and cleared for normal usage. The reconstruction referred to can proceed gradually, with suitable graphic representations being selected by the investigator and retrieved from the data library on an item-by-item basis as soon as GPS-measured coordinates for each corresponding item or feature at the accident site have been received and recorded.

The graphical representations are constructed using both the stored GPS position point data for each evidence item and corresponding graphic information for each evidence item selected from the database library. The reconstructed graphic representations of the accident site then can be displayed in any direction from any vantage point selected by the investigator and also can be rotated in three dimensions.

The stored data from the individual items of evidence can be used to calculate acceleration and/or speed vectors in time-sequence to display a visual presentation of the accident. Such data can be used for three-dimensional computer simulations to calculate speed and acceleration rates of vehicles during an accident. For example, tire marks (skid marks), road markings and other data points can be used to show the user the position of a car before an accident. The simulation software can then re-position all involved vehicles to the beginning of these markings. Since all data is recorded in 3 dimensions, the simulation software can show the investigator the view from the vantage point of the car driver or other involved vehicles. All items of entered evidence will be shown in correct 3-dimensional relation to each other and in correct time-sequence.

When using a PDA as computer 14, the computational, storage, and graphical capability is presently quite limited, so if computer 14 is a PDA, only a two-dimensional "overview graphic" is displayed on PDA screen 14A. This is adequate to enable the investigator to verify whether all items that must be measured actually have been correctly measured. If all measurements have been correctly made and recorded, the investigator can close the file and return to another location to do further analysis of the accident site. However, if computer 14 is a laptop computer or desktop computer, all features of the system software are available on GPS receiver-pole 41 at the accident site.

The graphic representation of any GPS-measured item can be easily moved on the screen for analysis. When the original data is imported, the real and measured position of the vehicle is shown again, and the graphic can be stored under a separate file and file format. The GPS data measured and recorded is stored in a file with a specific format. This data is the original data collected by the investigator at the accident site. If a change in the position of a certain object at the accident site is required after the original measurement and recording thereof, the investigator can later "manually" move the displayed graphic representation of the object, for example to aid in an analysis.

For example, the location of the graphic representation of a witness can be changed. When collecting the site data, the investigator may have been informed that the witness was standing in a particular location, but later the witness states that he/she actually was standing somewhere else. The investigator can then manually go into the display software and change the location of the graphic representation of the witness. However, the integrity of the original site acquired data is never overwritten, and the original file is protected by the display software; overwriting of the original GPS data is not allowed. A manually modified file is stored under a separate name. This ensures that the original GPS data file is never corrupted, which is important in many legal and insurance matters. There may also be a need to return to the accident site and accurately reproduce, within a few centimeters, the locations of objects, vehicles, people, skid marks, signs, etc. that were present at the time of the accident. Mobile accident recording system 40 provides this capability because of the secure file system of the original raw GPS data.

The various kinds of evidence that often need to be measured and characterized at an accident site using the mobile accident recording system 40 of the present invention are described next.

Various position points for which various movable items of evidence can be displayed by the above mentioned prompting program and displayed on computer. Typical movable evidence items include humans (including injured humans and human body parts), bystanders, animals, single-track vehicles such as bicycles, motorbikes, motorcycles, etc., multi-track vehicles such as automobiles, trucks, etc., trailers, and machinery, etc. Injured humans usually are measured in a prone position. To define the exact position of a human body, heels, knees, hips, hands, elbows and noses are measured as position points. Position points of animals involved in accidents are selected and measured similarly After an accident, single-track vehicles may fall down or be upright or leaning against something. The key position points to be measured for single-track vehicles include the axle hubs and the highest point of the handle bar. The position points determine the exact position of the single-track vehicles so they can be accurately shown in a sketch, and when compared with stored database library information for the particular single-track vehicle, can also show whether the front wheel fork has been bent.

During an accident, a multi-track vehicle such as an automobile may collide with other objects, persons, etc., or may leave the road, and may be undamaged or damaged. The geometric dimensions of an undamaged vehicle can be obtained from a database library, so the amount of damage can be determined after the investigator makes GPS measurements of external features of the vehicle, which then can be compared with the stored database images to determine the magnitude of the damage features. For an undamaged vehicle, all that needs to be measured is its relative position at the accident site, and that is accomplished with the required accuracy by simply calculating the locations of the centers on the basis of the measurements of the tire rims. This avoids measurement discrepancies with corresponding database information due to different types of tires that may be on the same model of a vehicle. The center of a wheel is found by taking measurements from three points along the circumference of the outer edge of the rim thereof. The rim centers can be used to calculate the distance between the axles.

In addition to being deformed, damaged vehicles may be in abnormal positions such as lying on a side or roof. Such positions can be accurately recorded with the help of the tire rim center position point measurements in relation to the road surface. In general, damage can occur to any part of a vehicle, and deformations of a vehicle body ordinarily result from outside forces that drive a portion of the outer body metal inward toward the interior of the vehicle and/or disarrange the chassis/frame, often shifting the locations of the wheel centers. Thus, some deformations in the body of the vehicle can be accurately determined by the computed shift in the positions of the wheel centers based on the measurements of locations of the tire rims. Other deformations of the metal outer body and supporting structural frame of a vehicle can be determined the calculations based on other position point measurements. Often, the heaviest damage is found at the level of the chassis supports, which are normally designed to absorb the most energy in an accident. Trucks and other multi-track vehicles can be measured in generally the same way as described above for automobiles, the main difference being the larger number of axles. Trailers may be connected to any of the above vehicles. The geometric data of most trailers is available in the database library, so the measurement methods described above are used. If possible, the positions of the towhook and trailer coupler are measured and recorded.

Relevant stationary items of evidence at the accident site also are measured with GPS receiver-pole 41. Examples include various features characteristic of the accident site and its surroundings such as road features, natural surrounding surface features, vegetation such as trees, shrubs, hedges, and the like and man-made objects/structures such as buildings, fences, walls, etc., all of which have position points that need to be measured and recorded.

On a curved road, position points to be measured must be selected along the edge of the road to make it possible to accurately calculate the radius of the curves. Usually, measuring and recording a position point every 10 meters will suffice unless an intersection is in the area to be measured; in that case, the distance between successive position points to be measured should be appropriately reduced, e.g., to as little as about 1 meter. Road surface markings indicate the right and left edges of the road (unbroken painted lines), the center of the road (broken and unbroken painted lines), closed areas (oblique painted lines), pedestrian crosswalk lines, stop lines, direction mows, and border lines for parking and stopping areas. The position points to be measured for the broken line center of the road markings include the length and width of each section. Unbroken lines are measured in steps of 5 meters length along one edge. Closed areas are measured as polygons along the outer boundary thereof in 2 meter steps. The lengths and arrowhead locations of traffic direction mows on the road surface are measured. Other marks on the road which need to be measured include tire skid marks, which are measured from the first recognizable point thereof along each edge to the point where they end. Curved skid marks are measured every 2 to 3 meters depending on the radius of curvature. Multiple crossing skid marks are measured along their outer outlines. (Note that the distance of 2 to 3 meters is not valid when operating the system in the "continuous mode", because in the "continuous mode" the distance between points at which GPS measurements are automatically made every second depends on the speed of the user.)

Sometimes a liquid spill will be present on the road for adjacent surface. The liquids will usually splash in a "V" or fan shape outward from the source onto the road or ground surface. The position point measurements follow the "V" or fan shape, starting at the apex along the side lengths, and also are made so as to measure the greatest width between opposite edges of the spill. Parts which have been torn or ripped off a vehicle are measured where they lie. For other relevant objects, a suitable number of position point measurements is taken so that sufficient data is available for accurate positioning of the objects in a three-dimensional sketch of the accident site.

Traffic signs are defined and listed in the appropriate laws and regulations. The sizes of traffic signs are standardized so that only two points are needed to define the location of the position, the base point of the sign or the base point of the sign pole, and the point where it is fastened. The position point for a traffic signal light is the base of the mounting pole. The position point for a streetlight is the base of the mounting pole. The position point for a reflecting post is the base of the post. The position points for a guardrail are located at 5-meter intervals along the lower edge of the lowest rail. For manhole cover/sewer grates, the position points are at the corners of a rectangular grate, or a 3-point measurement is taken around the circumference of a round grate.

Other associated accident evidence items may also be present and must be measured/recorded, including sidewalks or paths (for which the width, height relative to the road are measured/recorded), road shoulders (for which width, height above or depth below the road are measured/recorded), plants such as bushes and trees (for which 3 points around the circumference are measured/recorded), and walls and fences (for which base points and height along the length are measured/recorded).

The position points that need to be measured using GPS receiver-pole 41 are stored and displayed by the prompting program on the screen of computer 14 during the process of prompting the investigator to make the needed position point measurements at the accident site.

The investigator can select the type of evidence to be measured and is given exact visual and audible instructions during the prompting process on how to proceed with the recording of selected type of evidence. Comments from the operator can be input, by using a provided keypad or microphone. Any position point measurements can be annotated by voice comments and stored with the corresponding position points The voice comments can be replayed for any particular displayed position point during the subsequently described position of the accident site using the measured and stored position point data and corresponding graphical information retrieved from the database library.

The above mentioned database library of the mobile accident recording system 40 contains all necessary information to include with the data measured and recorded using GPS receiver-pole 41 to display a graphical but quite realistic view of the accident location including the above identified evidence items that may be present at the accident site, such as vehicles, trees, buildings, road features, fences, animals, people, signs etc. The recorded information required for accident evidence includes the basic x,y,z coordinate data measured by GPS receiver-pole 41 and appropriate detail information, such as the manufacturer and model of an automobile. In addition to such details, nominal geometric data such as the exact dimensions and weight of the original vehicle can be included.

The database library features that can be added to simulate the accident site also includes weather conditions such as amounts of rain, fog, sunlight, moonlight, darkness etc. Various colors can be provided for the graphical representations of all of the evidence items. Different kinds of automobiles and different kinds of headlights, and the database library permits the "visibility" in the simulated reconstruction of the accident site to account for the proper intensity of the headlights of a particular model of vehicle involved. The simulation of lighting conditions that the accident site provides an accurate determination as to whether certain items were visible from any selected vantage point.

FIGS. 5A–D illustrate four examples of prompt screens displayed by computer 14 to accomplish this procedure. In each case, various kinds of marks and points are "checked off" using computer 14 to indicate whether they need to be measured by the police and/or other investigators. In each case, the kinds of marks and items of interest are selected using computer 14, which prompts the investigator to go to the predetermined first point to begin the GPS measurement procedure.

Figure 5A:
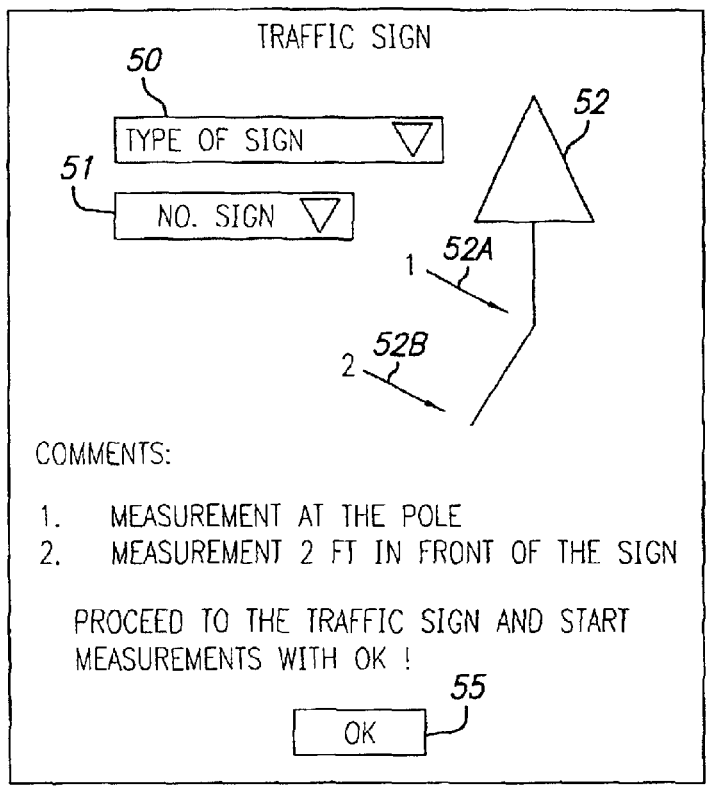
FIGS. 5A–D constitute a sequence of diagrams of various prompting panels displayed on the computer of the mobile accident recording system of FIG. 1.

FIG. 5A shows the prompting screen displayed for the category of traffic signs, wherein drop-down menu 50 enables the investigator to select the type of sign, e.g., stop sign, speed limit signs, yield signs, etc. Drop-down menu 51 enables the investigator to select the traffic sign he/she is going to measure from a library of predefined signs. In the unlikely case that such a sign is not in the library, the investigator can describe the sign by selecting "others" and can add a comment so that the software can replace the original sign later. Reference numeral 52 designates the standard traffic sign to be measured, the base of sign 52 being indicated by "1", which indicates that the first GPS measurement is to be made by placing the lower tip 2A of pole 2 at the base point indicated by arrow 52A pressing the OK button 55. The numeral "2" indicates that the second GPS measurement is to be made by placing the lower tip 2A of pole 2 at a point on the ground a few feet in front of sign 52, as indicated by arrow 52B, and pressing the OK button.

Figure 5B:
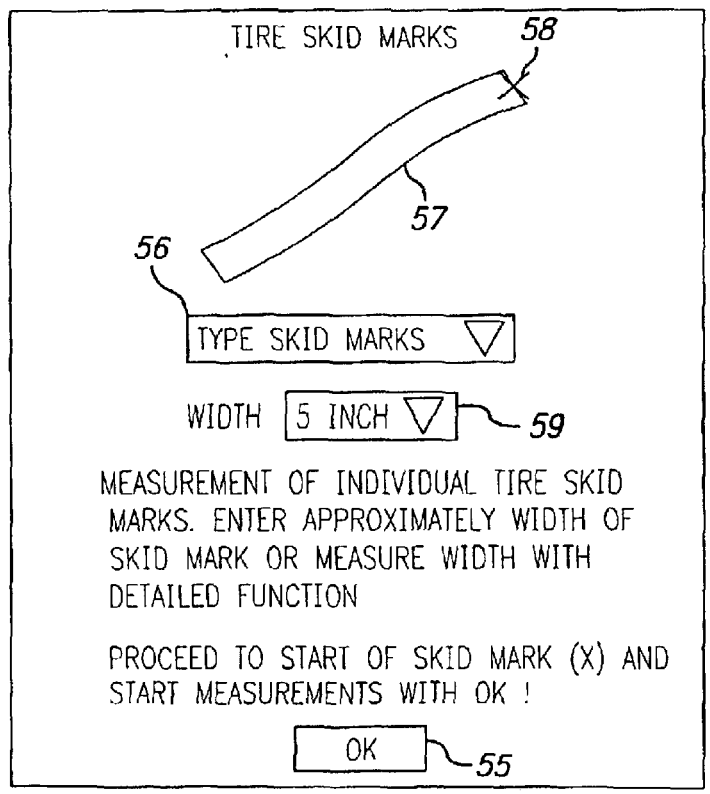

FIG. 5B illustrates the screen displayed by computer 14 to prompt measurement of tire skid marks, wherein drop-down menu 56 allows the investigator to select the type of skid. There are different types of skid marks. The investigator can define what type of skid mark it is (e.g. drifting, blocking brakes, etc.). This is important for later. analysis, because the investigator can measure the orientation of the tread of a tire, which up to now has been almost impossible. The X designated by numeral 58 indicates the starting point for the first GPS measurement of skid mark 57. The width of skid mark 57 is selected by means of drop-down menu 59. The length of skid mark 57 is measured by rolling the wheel 11A from the starting point X to the opposite end of skid mark 57.

Figure 5C:
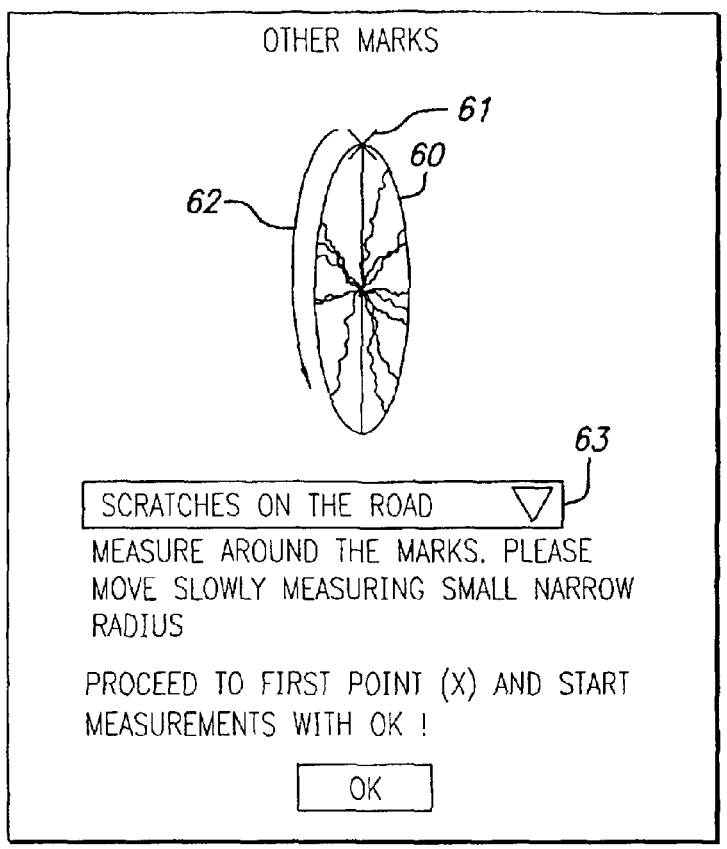

FIG. 5C illustrates the screen displayed by computer 14 to prompt measurement of other types of marks at the accident scene which are not included in the main menu. Drop-down menu 63 prompts the investigator to select the type of mark. The display prompt investor to start at a point X, initialize the measurement by pressing the OK button, and then roll wheel 11A of the wheel assembly 11 completely around the mark area 60, as indicated by arrow 62.

Figure 5D:
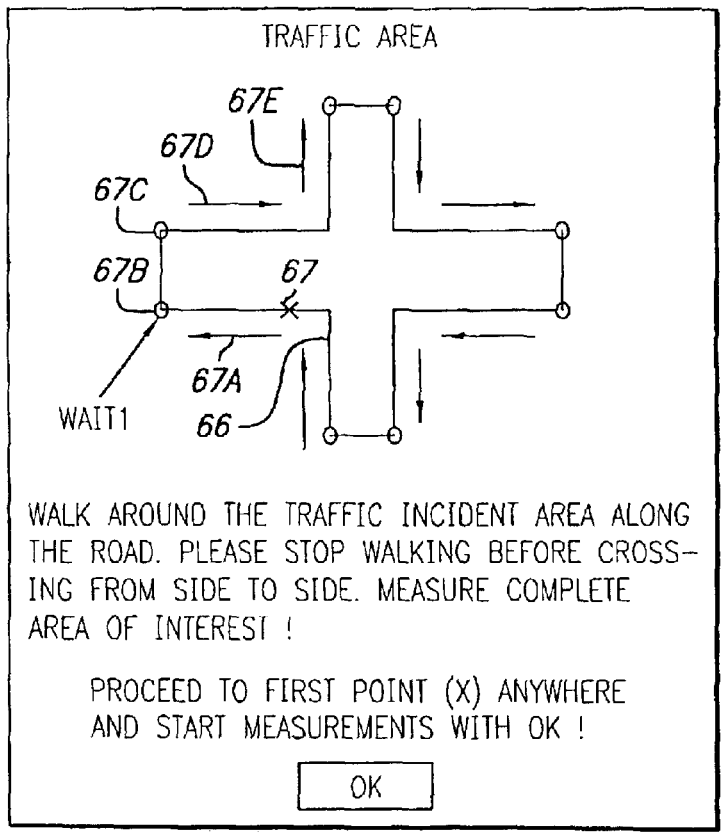

FIG. 5D illustrates the screen displayed by computer 14 to prompt the investigator to measure a surrounding area that accurately represents the relevant area of the accident scene. The investigator is prompted to attach the wheel 11A to the bottom of pole 2 and then roll GPS receiver-pole 41 from the point X indicated by reference numeral 67 along the road in the direction of arrow 67A to a point 67B, and then wait for the few seconds to indicate that the investigator then will cross the street to a point 67C. The investigator then proceeds in the direction of arrows 67D and 67E in the same manner, all the way back to the starting point X, so as to completely measure the traffic area. In this mode, GPS unit 3 automatically measures and records the point contacted by the bottom of wheel 11A every second.

The coordinate data measured and stored is in the ASC II file format, which usually requires just a few kilobytes of storage for a typical accident scene. That coordinate data is maintained in unmodified form, encrypted if desired, and is prevented from being manipulated or modified.

In accordance with the present invention, the measured and stored GPS data for the accident site is utilized in conjunction with the large previously stored library of data to re-construct a database that can produce a realistic three-dimensional image of accident scene from any perspective and direction. The library database contains precise graphic representations of all of the items commonly found in the vicinity of an accident scene, including various models of automobiles, various kinds of trees, shrubbery, walls, hedges, buildings, fences, highway marks, traffic signs, surrounding buildings, weather conditions, illumination conditions including illumination conditions due to automobile high beam and low beam headlights, and numerous other items.

In the described invention, after all the GPS data representing the x,y,z coordinates of all items of interest at the accident site have been measured and stored, that stored data can be transferred in any convenient manner to the "base station", i.e., computer 17, which can execute a reconstruction program (as indicated with reference to subsequently described FIGS. 8A–C) to reconstruct a realistic three dimensional graphic replica or representation of the actual accident scene. (Of course, the reconstruction program also could be executed by computer 14 or other computer used in place of computer 14 if such computer 14 were to have the requisite computing and data storage capability.)

FIGS. 6A–6G show a sequence of "screens" that typically are displayed by computer 17 (although they could be displayed by computer 14 or other suitable computer) in the process of producing a realistic reconstruction of the same accident scene shown in the photographs represented by FIGS. 4A and 4B. The first step in the accident scene reconstruction process is to "import" the GPS-measured accident data into computer 17, which already has the data library and the accident scene reconstruction program stored therein. The imported data is subjected to some "rule checks" to ensure that all required accident scene data has been obtained for all required measurement points of all items of interest. The accident data then is utilized to create a "line drawing" plan view representation of the accident scene.

Figure 6A:
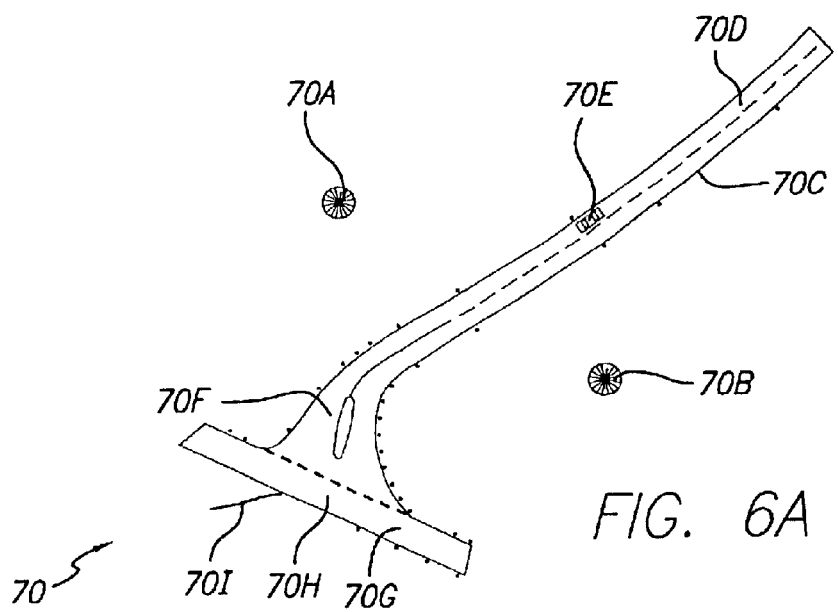
FIGS. 6A–G are diagrams of a sequence of panels displayed on a laptop computer coupled to the PDA computer of FIG. 1A showing stages of re-construction of realistic views of the accident site based on measured data and on previously stored library data.

In the example of FIG. 6A, lines representing an intersection between paved section 70G and paved sections 70C are shown. Paved section 70E of FIG. 6A corresponds to GPS data obtained by measuring paved section 25 in FIG. 4A. Paved section 70G of FIG. 6A corresponds to GPS data obtained by measuring paved section 27 in FIG. 4B. Indicia representing two shrubs 70A and 70B are shown to the right and left of paved section 70C. reference numeral 70D and 70H represents painted highway line marks. Reference numeral 70I represents a tire skid mark. Reference numeral 70F represents a small grassy divider island. An automobile is represented by indicia 70E. Also, a legend including numbers and comments identifying/regarding the various features in screen display 70 are included.

Figure 6B:
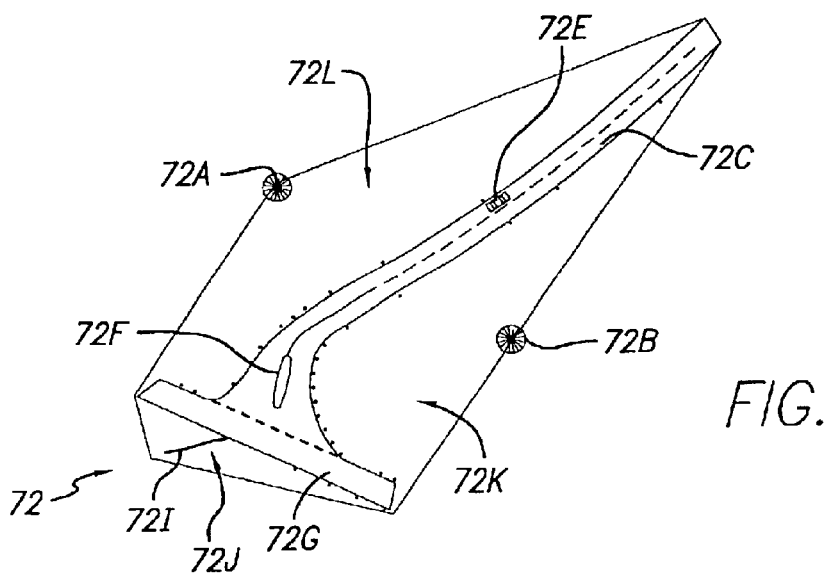

Next, screen display 72 in FIG. 6B illustrates the next step in the reconstruction, wherein suitable icons or graphic representations selected for each "line drawing" feature displayed in screen display 70 of FIG. 6A are displayed in place of the "line drawing" features. Reference numeral 72C represents the paved section 70C in FIG. 6A. Graphic shrub representations 72A and 72B of the appropriate color are displayed in screen 72 in place of line indicia 70A and 70B in FIG. 6A. Green grassy areas are represented by appropriately colored areas 72K and 72L on either side of paved section 72C. Indicia 70F in FIG. 6A is replaced by an appropriately colored area 72F in screen displayed 72 of FIG. 6B to graphically represent the grassy divider island previously referred to. An embankment in the foreground of FIG. 6A is represented by appropriately colored area 72J adjacent to paved section 72G in FIG. 6B, with the skid mark 70I in FIG. 6A being represented by a more realistic graphic representation 72I in FIG. 6B.

Figure 6C:
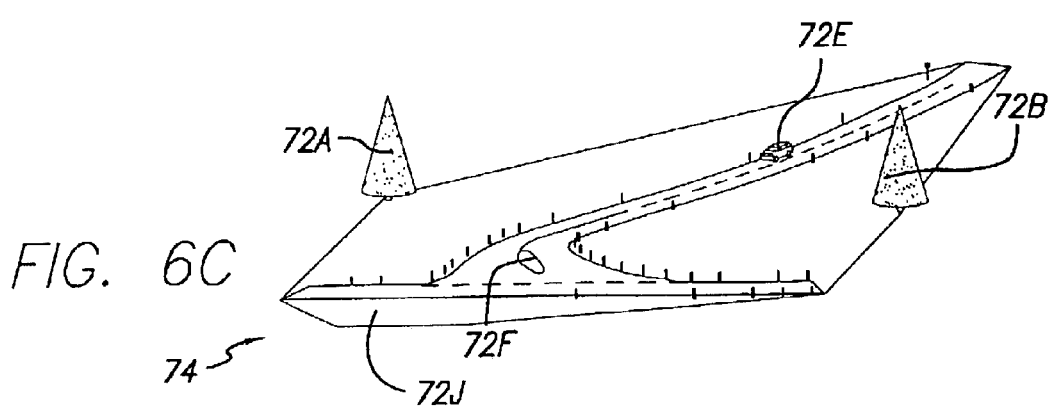

In FIG. 6C, three-dimensional coordinate grid lines are superimposed on the reconstructed graphical representation, which allow accurate measurement of distances between selected points of the accident scene, and the three dimensional displayed image in screen 74 is shown from the preselected vantage point. At this point, any desired vantage point within the boundaries of the accident scene can be selected, and the three-dimensional view of the reconstructed accident scene in any selected direction can be displayed from any selected vantage point.

Figure 6D:
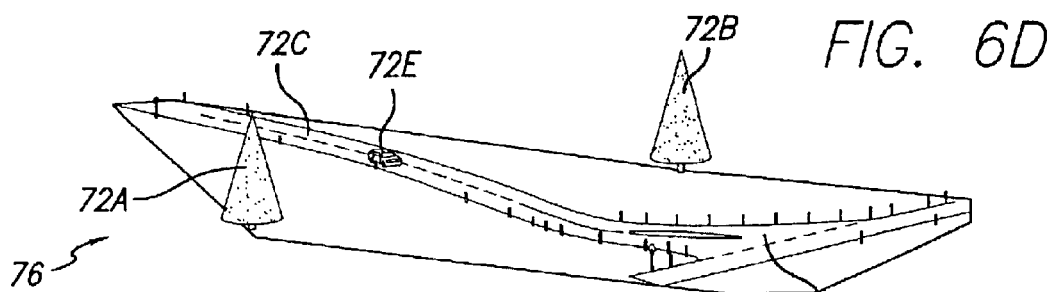
Figure 6E:
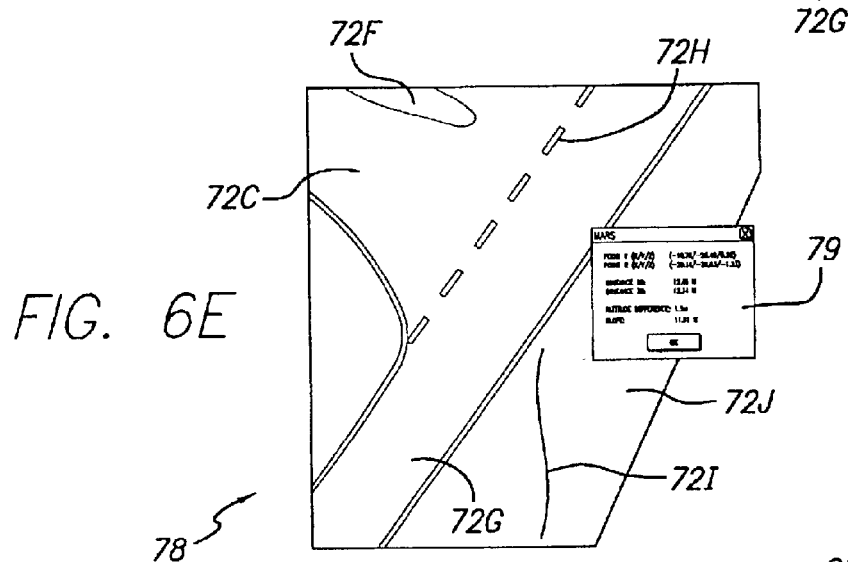
Figure 6F:
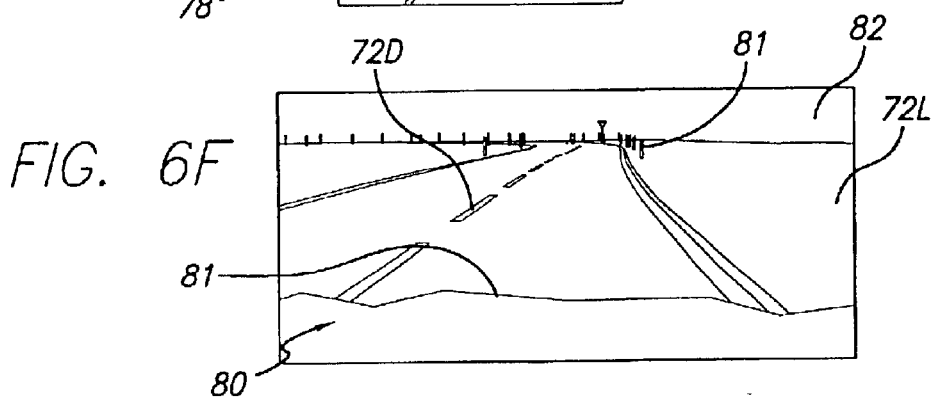
Figure 6G:
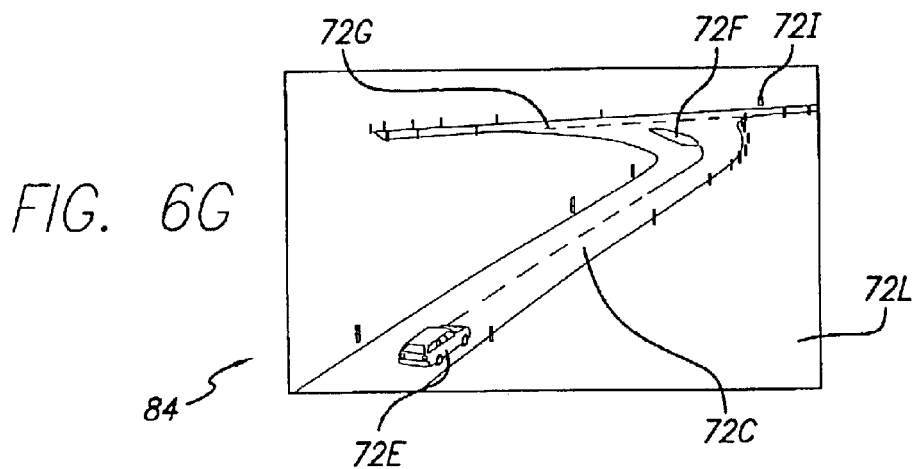

FIG. 6D shows another perspective view 76 of the same accident scene. FIG. 6E shows another display screen 78 illustrating an enlarged view of the intersection clearly showing skid mark 72I on embankment 72J. A information window 79 indicating the three-dimensional distance between two selected points within the perspective view also is shown. FIG. 6F shows another screen 80 illustrating the view as seen by the driver of automobile 72E, and screen 84 of FIG. 6G illustrates the perspective view from a vantage point behind and above automobile 72E. Note that the library data permits the graphic representation of automobile 72E to be very accurate. For example, its various windows can be shown as open, partly open, or closed, its headlights can be represented as being off or on, and headlights that have been turned on can be represented as being high beam or low beam and the amount of illumination produced by them under the ambient conditions recorded when the accident site data was measured can be accurately represented in the image displayed in screen 84.

Figure 7A:
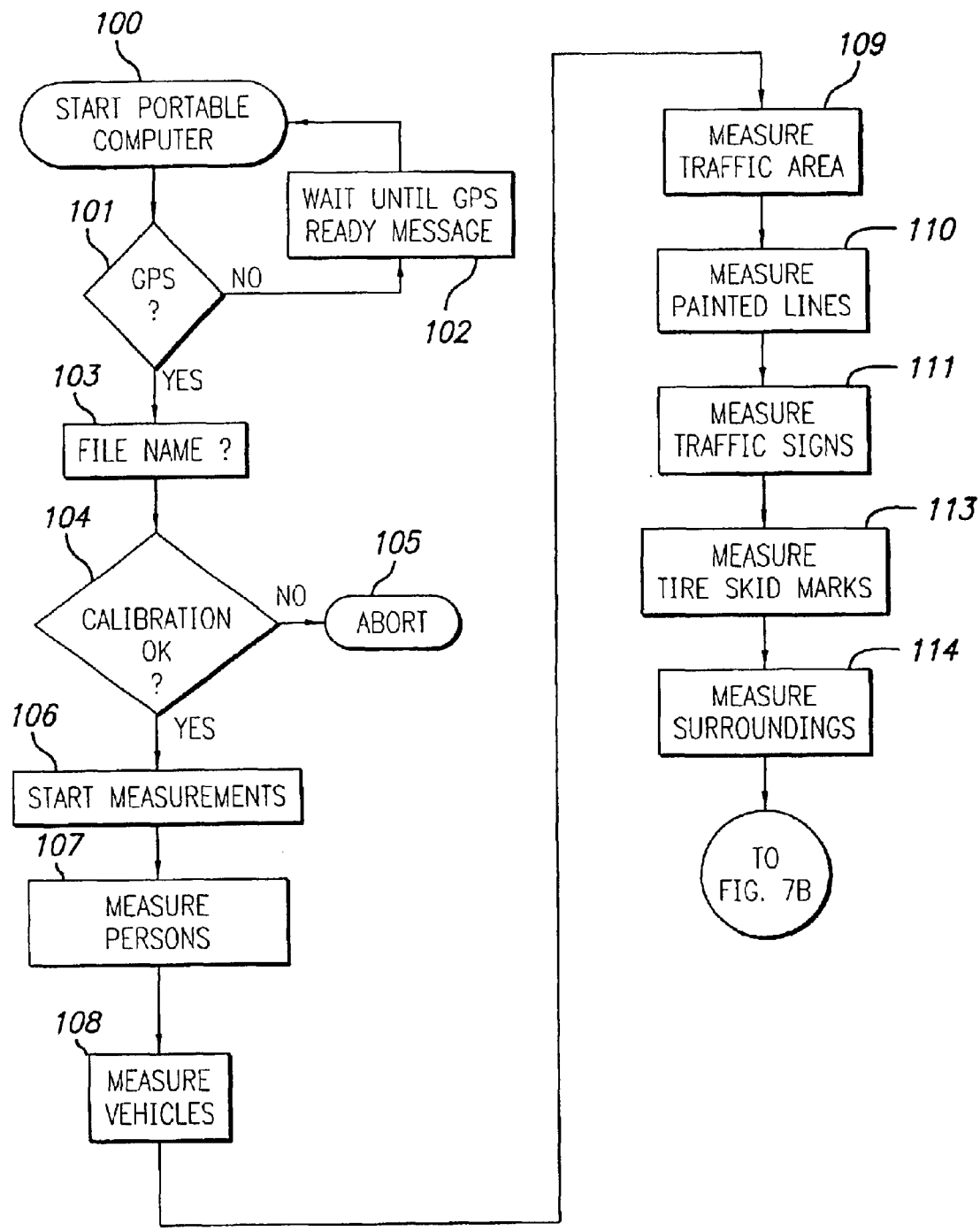
FIGS. 7A and 7B constitute a flow chart of a computer program that controls operation of the mobile accident recording system shown in FIG. 2A and graphical reconstruction of a realistic representation of the accident site using data measured and stored by means of the GPS receiver-pole shown in FIG. 1A.
Figure 7B:
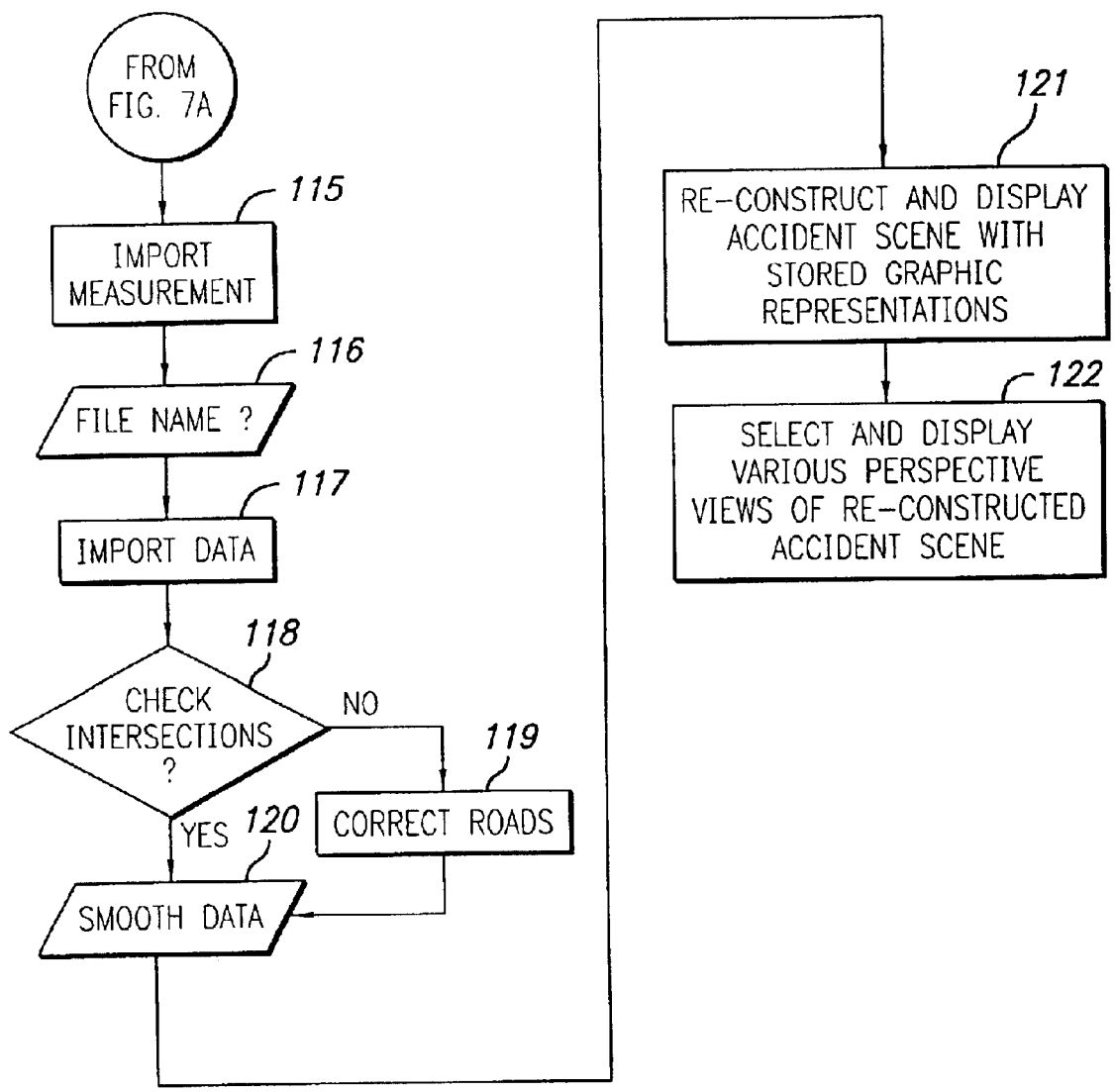

The flowchart of FIGS. 7A and 7B shows details of the program which produces a prompting display exemplified by the sequence of prompting screens shown in FIGS. 5A–D and the step-by-step "reconstruction" of a scene of the accident site based on measured GPS data of accident site and previously stored library data.

Referring to FIG. 7A and 7B, a global GPS test is performed automatically when the mobile accident recording system 40 is switched on as indicated in block 100. As indicated by the loop including decision block 101 and block 102, the user can go ahead with the measurement if all tests are passed, in which case a connection to the "base station" computer 17 is established and "correction data" for computer 14 is received. The differential GPS correction data is input to the mobile accident recording system GPS receiver from a differential GPS reference station via a cell phone connection or antenna 9 and RF link 18 shown in FIG. 2A. The common differential GPS measurement technology is used, wherein because of a stationary base station receiving the same GPS data, the system can calculate the error of the received GPS signal in the mobile station and correct this data. The correction data is used to allow operation of GPS unit 3 in the well-known differential GPS mode, and either is provided by a separate portable base station or by a special service provider via cell phone or other wireless communication. Note that if computer 14 is sufficiently powerful to store and execute both the above mentioned prompting program and the "realistic" three-dimensional accident scene reconstruction program and also store the corresponding three-dimensional data in the data library, then the entire program shown in FIGS. 7A and 7B could be executed in computer 14. In any case, computer 14 stores and executes a "basic" accident reconstruction program that produces a real-time simplified symbolic representation of accident scene of the display of computer 14, item-by-item, by selecting corresponding stored symbols for the various items from the memory of computer 14 as the items are measured and stored using GPS receiver-pole 41.

Every measurement of an accident scene is stored in a unique file with protection against manipulation. As indicated in block 103 of FIG. 7A, the investigator has to enter the name of that file under his or her authorized user name.

After the above GPS test operation, a calibration test has to be performed, and if the calibration test results are not acceptable according to the criteria of decision block 104, then the GPS measurement procedure is aborted, as indicated in block 105. In the calibration test, the user measures a known dimension to verify that the GPS measurement system is properly calibrated. The carrying package has different marks thereon which define the known dimension referred to. The investigator operates GPS receiver-pole 41 to provide the coordinates of those marks and stores those coordinates with the other GPS data so that it can be relied upon in the future if necessary to prove that the GPS system was properly calibrated.

At this point, the mobile accident recording system 40 is calibrated and initialized and ready to use. As indicated in block 106, the next step of the accident scene measurement procedure is to begin making GPS measurements by using GPS receiver-pole 41 to make detailed measurements of various points of the accident scene in accordance with a prompting sequence displayed by computer 14. The GPS measurements are made first of those items at the accident scene which can be readily removed. The prompting program executed by computer 14 displays detailed instructions on which type of mark should be measured first and how to begin the GPS measurement procedure on it.

Next, the locations of witnesses and the locations and positions of persons lying on the road or ground are measured, as indicated in block 107, as the exact position of such persons is usually important for later analysis of the accident scene. The position of a person lying on the road is performed in accordance with specific detailed instructions displayed by computer 14, which prompts the investigator to measure the position of the person's head, body and legs so that the precise position of the person on the road is completely defined.

Automobiles and/or other vehicles are measured next, as indicated in block 108. Vehicles at the accident site are likely to have been previously characterized in an extensive database which is included in the data library stored in computer 17. (The library database thoroughly describes most cars and vehicles that are likely to be present on public roads.) The data base includes outline dimensions of most vehicles, so accurate measurements are required to be measured only for all of the wheels of each vehicle using GPS receiver-pole 41. The mobile accident recording system 40 automatically calculates the exact position of the center of each wheel from three or more points of the edge of the wheel rim. (PDA 14 already has been utilized to make the required vehicle selection from the data library, which means, for example, that if the investigator forgets to photograph an item that is necessary, he/she can only recognize this later while an analysis is being performed. Consequently, there is no opportunity to add the missed item.)

Next, GPS measurements are made of the general traffic area, as indicated by block 109. Apart from the vehicles present at the accident site, the characteristics of the general traffic area is the most important aspect of the accident scene. The GPS measurements required to adequately and accurately characterize the accident scene are obtained by walking around the accident scene while rolling wheel 11A of GPS receiver-pole 41 in the above mentioned continuous mode, along lines identified by the display of computer 14 in accordance with specific prompting displayed thereon. In the continues mode, a GPS coordinate measurement is performed and recorded every second, whether wheel 11A is rolling or not. The investigator walks around the entire area of interest, rolling wheel 11A continuously as prompted and pausing as prompted to indicate that the next portion of the path traveled by wheel 11A indicates a crossing of the street by the investigator to enable the mobile accident recording system 40 to recognize the existence of a road intersection.

Next, painted lines on the road are measured, as indicated in block 110. The exact locations and lengths of such painted lines can be important to future legal analysis of the rights of different persons involved in the accident. The data library stored in computer 17 includes a database of predefined painted highway lines and marks, to make it easy for the investigator to display images and locations of the different types of painted highway lines.

As indicated in block 111, the next portion of the GPS measurement procedure is to make measurements of all traffic signs at the accident site. An accurate image of every possible sign is included in the data library. The orientation of each traffic sign selected as being present at the accident site is recognized by mobile accident recording system 40 is as a result of the prompted procedure by which the investigator makes measurements corresponding to that traffic sign. If multiple traffic signs are mounted on a single pole at the accident site, the investigator can select a number of corresponding traffic sign images and place them on corresponding points of an image of a pole.

As indicated in block 113, the next step in the GPS measurement procedure is to measure all observed tire skid marks. The investigator uses GPS receiver-pole 41, with the mobile accident recording system 40 operating in the continuous mode, in order to roll wheel 11A along a tire skid mark. Every swerve of the skid mark therefore can be accurately measured and recorded, which is very important for later analysis and/or simulation of the accident in order to demonstrate and to provide legally acceptable proof regarding the movement of the vehicle or vehicles involved in the accident.

Next, as indicated in block 114, specific points of various features constituting the relevant surroundings of the accident site are measured in accordance with specific prompting by computer 14. In particular, GPS measurements are made of particular points of items which may have been directly in the line of sight for a vehicle driver, passenger, or any other witness. Accordingly, specific points of any items such as a hedge, tree, wall, building, etc., are measured.

Predefined or user defined stored macros or symbols then can be used later, in conjunction with the three-dimensional coordinates of the predetermined points of the items measured in order to later reconstruct a realistic graphic image of the accident scene.

To accomplish this, the measured and stored GPS data for the accident site is transferred to or "imported" from computer 14 to computer 17, as indicated in block 115 of FIG. 7B. (This transfer can be accomplished via cable, infrared, or wireless connection from PDA to computer 17, or by simply unplugging memory card 15 with the stored/recorded GPS-measured accident scene data from PDA computer 14 and putting it into computer 17.) As indicated in block 116, it is necessary for the investigator to enter the name of file containing the measured accident data. The next step is to effectuate the actual transfer of the stored accident data from computer 14 into the accident scene reconstruction program stored in computer 17, as indicated in block 117. The individual data point entries are checked against possible unauthorized manipulation, and a syntax check is performed.

It is very important that the number of measured intersections be correct. As previously indicated, the intersections of various roads within the accident site are automatically recognized by the accident site reconstruction program. Nevertheless, it is possible that the automatic recognition process is not accurate, for example, because the investigator forgot to wait for a few seconds as required before crossing over a road while making measurements of the traffic area according to previously described block 109 of FIG. 7A. As indicated in decision blocks 118 and 119, the investigator can, with the assistance of prompting provided by the accident reconstruction program executed by computer 17, make the necessary corrections necessitated by any incorrect automatic recognition of intersections.

Each position point has an associated identification number. The GPS data can be analyzed to omit use of redundant points, and the data actually used in an analysis can be "smoothed" (although the unused redundant GPS data can be re-displayed at any time). The display can include a legend that indicates the data point number of each measured point indicated in the display. Therefore, it is possible to later return to the accident site and determine exactly where the measured features or articles were located, so obvious errors in the data can be quickly recognized by comparing the graphical reconstruction of the accident site with the actual site, and such errors then can be corrected.

As explained above, in the "continuous mode" of measurement wherein wheel 11A is rolled along the feature to be measured, the coordinates of the point contacted by the bottom of wheel 11A is measured and recorded every second, resulting in a large amount of redundant data being stored. As indicated in block 120, a function of the accident reconstruction program smooths the data to reduce the number of data points utilized in the accident scene reconstruction process, although the redundant data is not destroyed. At this point, the GPS-measured three-dimensional data that has been measured and stored for the accident site can be utilized to reconstruct a realistic three-dimensional representation of accident site in any selected direction from any selected vantage point.

The software shows every wanted perspective from every individual point of interest within the measured accident site. There are many available predefined points of interest, including those from the vehicle driver's viewpoint, the witnesses' viewpoints, from a helicopter perspective etc. In all of the shown drawings the dimensions are always to actual scale. All vehicles are shown as three-dimensional models with authentic colors and appearance.

Figure 8A:
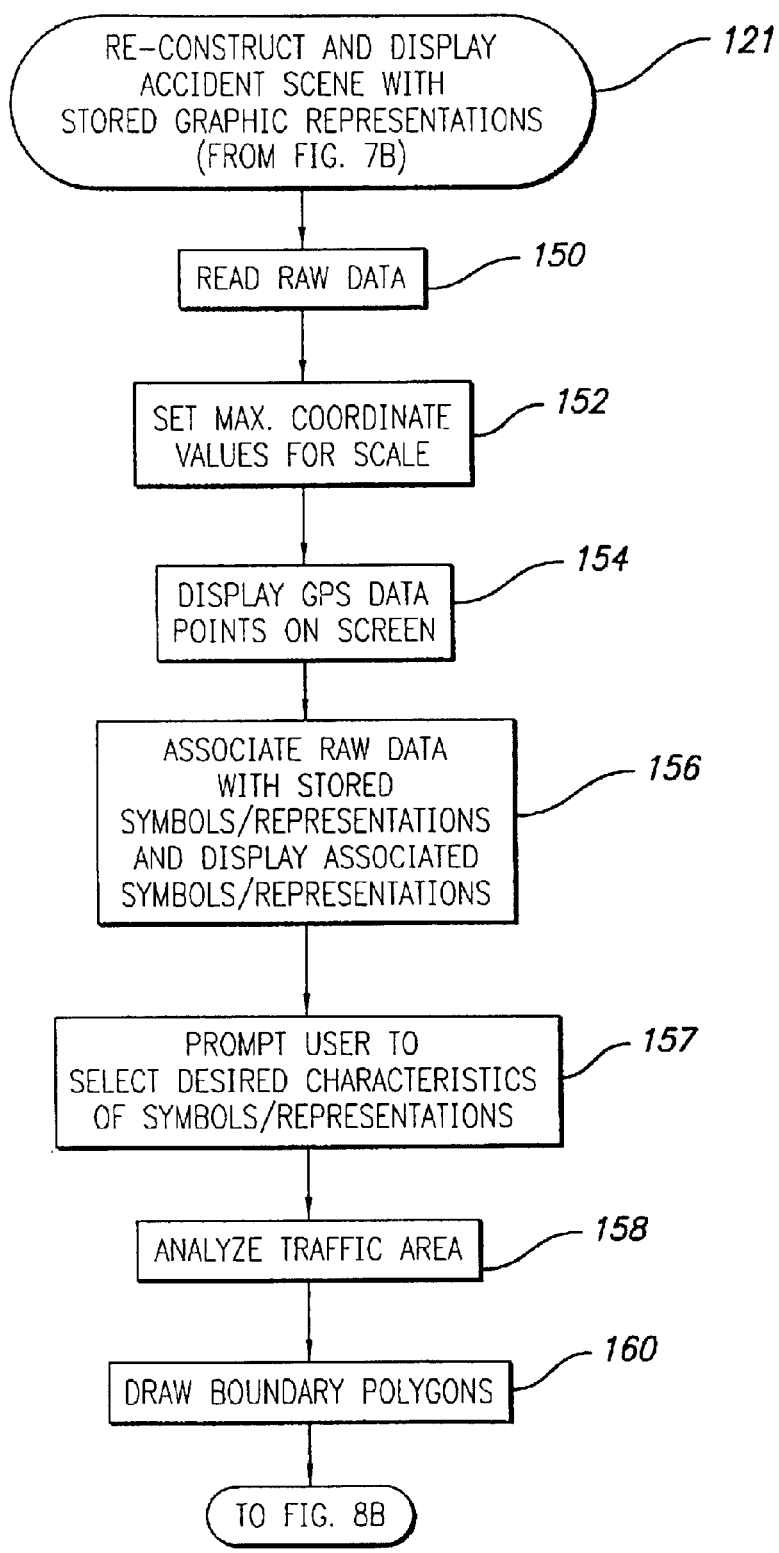
FIGS. 8A–C constitute a flow chart of a scene reconstruction program executed in block 121 of FIG. 7B to reconstruct a realistic three-dimensional image of the accident scene and display it from any selected vantage point.
Figure 8B:
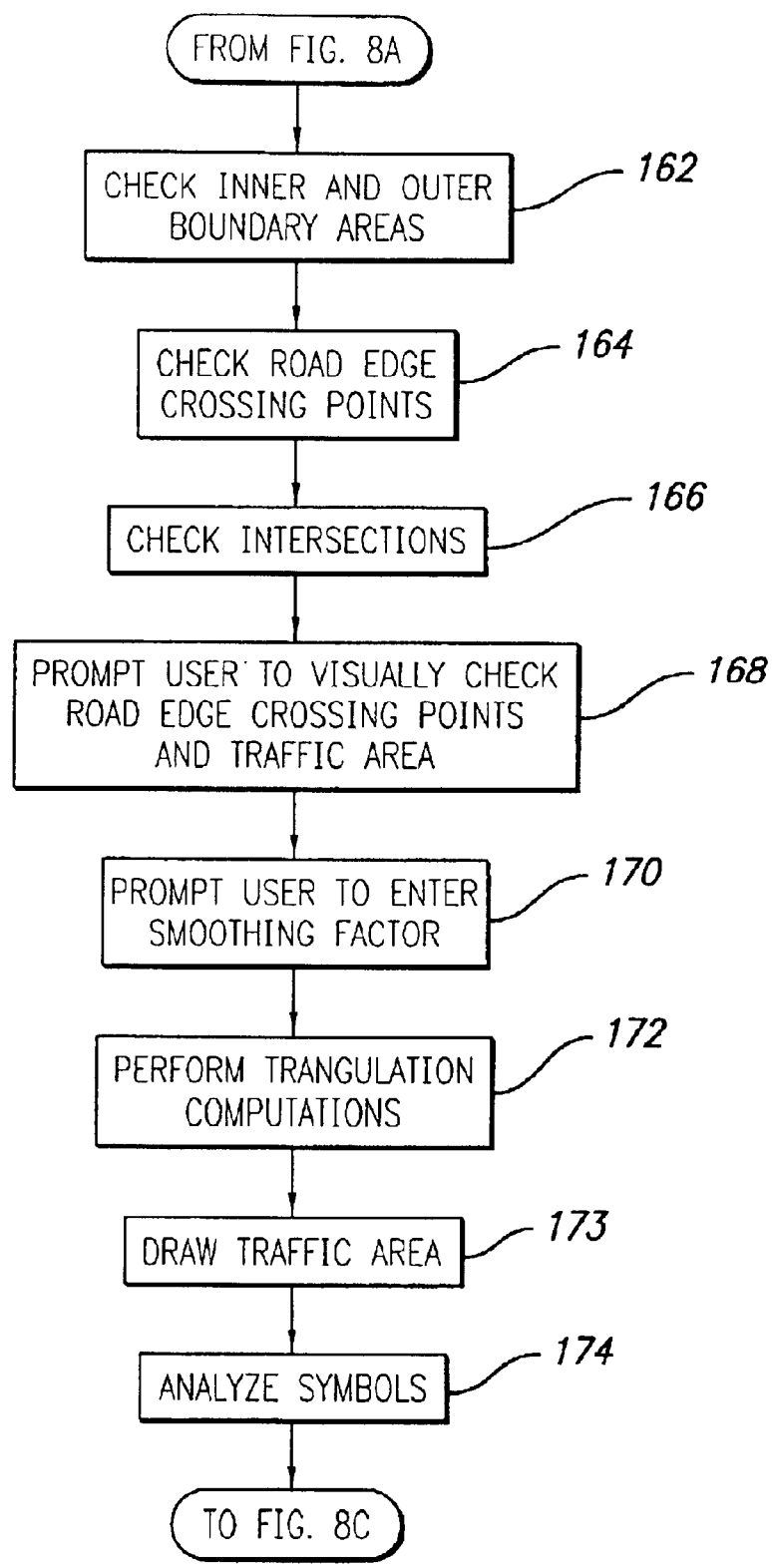
Figure 8C:
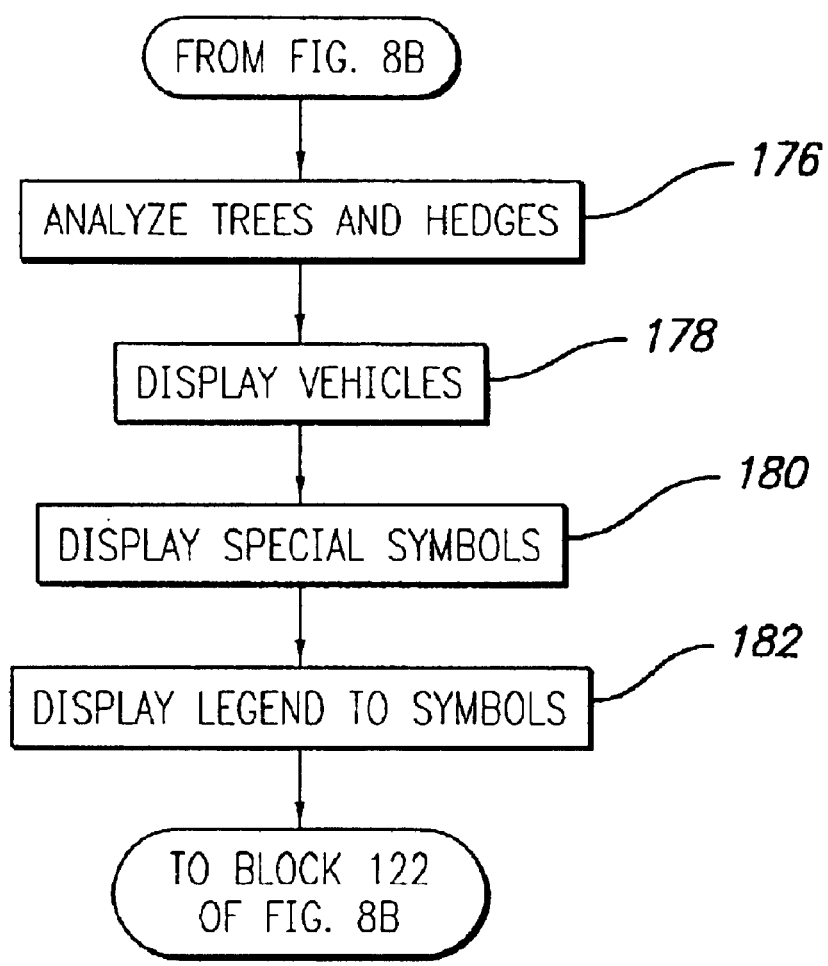

FIGS. 8A–C constitute a flow chart of the "accident scene reconstruction and display" program executed by computer 17 to reconstruct and display a realistic three-dimensional graphic image of the accident scene. As indicated in block 150, the first step of the reconstruction and display program, is to read the raw tilt-corrected GPS data, line by line. The read lines of raw tilt-corrected GPS data are checked for logical errors and for correct format. For example, the program checks to ensure that the distance between two points does not exceed a predefined value, and displays appropriate error messages to prompt necessary corrections. The next step is to determine the maximum values of any of the GPS data coordinates, as indicated in block 152, wherein all points are read into the memory of computer 17, and the "drawing" area is scaled to the maximum values.

Referring to block 154, an appropriate amount of "smoothing" of the measured GPS data is selected by the user by means of a displayed control panel to obtain an appropriate number of the most meaningfully spaced GPS data points and appropriate lines extending between them are "drawn into" a three dimensional grid area and displayed on the screen, as shown in FIG. 6A. The "line drawing" of the GPS data points in lines are drawn on a special "layer" for later analysis.

Referring next to block 156, the raw GPS data is separated (from other information stored in the file in addition to the raw GPS data, such as quality of measurement, number of points, etc.) and associated with the predefined symbols and graphic representations previously stored in the data library, and the associated symbols/representations that are displayed in place of the line representations of the GPS data indicated above in block 154.

As indicated in block 157, a control panel is displayed and the user is prompted to select various desired characteristics of the displayed symbols/representations. For example, the color and various other characteristics of a vehicle can be selected by the user, which results in the vehicle being displayed with the selected characteristics. As another example, the color and density of a displayed tree or hedge can be selected by the user, and the tree or hedge then is displayed with the selected color and density. The ambience illumination intensity also can be selected, and the reconstructed graphic representation of the accident scene is displayed with the selected illumination characteristics. Thus, the user can provide a great deal of refinement to the displayed symbols/representation so as to provide a very realistic precisely scaled graphic representation of an accident scene as it appeared immediately after the accident, with the ambience lighting conditions, weather conditions, and colors of all items and features present at the accident scene being very accurately displayed in the re-dimensional graphic reconstruction of the accident scene.

Then, as indicated in block 158, the traffic area is analyzed. This means that the traffic area is recognized and the outer bounds of the roads and intersections are interpreted. The relevant GPS data points are loaded into software buffers which build a data array for a routine that converts the individual points into a Bezier Polygon. As indicated in block 160, the boundary polygons are drawn on a special "layer". Then a decision is made as to whether or not painted lines are present on the road. It may be that the user does not use the GPS receiver-pole 41 properly such that the boundary of the road is measured incorrectly as he/she walks around the road at the accident site. Therefore, the reconstruction and display program calculates the measured points into polygons using the known Bezier methods. A Bezier curve is a mathematically defined curve used in two-dimensional graphic applications. The curve is defined by four points: the initial position and the terminating position (which are called "anchors") and two separate middle points (which are called "handles"). The shape of a Bezier curve can be altered by moving the handles. The mathematical method for drawing curves was created by Pierre Bézier in the late 1960's for the manufacturing of automobiles at Renault. Points which belong to such a polygon can be accessed by the system as objects. Furthermore, these points can be smoothed later so that a more realistic impression is provided to the investigator. Nevertheless, every measured point remains in the file, and can be displayed on a special layer. Any user can later display the calculated boundary of the road and the real measured points.

As indicated in block 162, the next step is to check the inner bounding and outer bounding areas, wherein a check is performed to define where the roads are an ensure that any road is within the calculated boundary polygons. This area then is identified and the GPS data is prepared for "triangulation" to generate the coordinates required for three dimensional display of the representation of the reconstructed accident scene.

As indicated in block 164, the next step is to check road edge crossing points, which means that, having the polygons of the boundary calculated, the road edge crossing points are checked. The road edge crossing points are recognized by the angle between two measured points. Therefore, if the predefined angle is exceeded, then a mark for an over passing is added to the image of accident scene being reconstructed. The user later can edit the number and the position of any road edge crossing point. This means, if the automatic recognition of the road edge crossing points is not correct, the user can make the necessary corrections. However, the road edge crossing points usually are detected correctly.

As indicated in block 166, the next step is to check the intersections, wherein the intersections are detected almost in the same way as the road edge crossing points. Intersections are detected by analyzing the angle and the position between different points. (However, the knowledge of an intersection is not very important, because the software is handling a traffic area. Internally the software doesn't care whether there is an intersection or just a wider part of the road. The software is handling an area which is limited by the boundary. As an result of the analysis of the traffic area, knowledge of the intersections are optional, because there is no special need to know these intersections in detail.)

As indicated in block 168, the next step is to prompt the user to visually check the displayed road edge crossing points and traffic area. The user can check the results of the previous calculations, and, if necessary, correctly modify the number of road edge crossing points needed so as to correctly identify the intersection(s). The software automatically checks whether the number of over passings set is plausible or not. As indicated in block 170, the user then is prompted to enter a factor for smoothing polygons. Because the triangulation requires a large amount of computational power for the typical amount of raw data involved, the number of GPS data points should be minimized. For example, if a section of road is straight, the calculation of redundant points is avoided. The user sets this factor between 0 . . . 50%. The value of the factor equal to 0 means that there is no smoothing of GPS data points at all, in which case the triangulation computations require more time than if the factor has a larger value.

As indicated in block 172, a triangulation process computations are performed, wherein the data is prepared and set up for the triangulation. The triangulation is performed according to the known Delaunay process, which is described at the following web site:

> www.iue.tuwien.ac.at/publications/phd%20theses/fleischmann/node43.html.

The resulting triangles are shown on the display and they also are "drawn" on a special layer. These triangles are important for later analysis regarding illumination at the accident site.

As indicated in block 173, the next step is to "draw" the traffic area. As a result of the triangulation, the different triangles of the resulting traffic area are drawn on the screen of computer 17. The user can momentarily see all the triangles, but because the information regarding these triangles is not important to the user, the images of these triangles are removed from the screen, but are stored by the reconstruction and display program. This information and the calculated data are the basis for every selected perspective image of the reconstructed accident scene that is displayed later on the screen of computer 17.

As indicated in block 174, the next step is to analyze the predefined graphic symbols and representations, wherein the various symbols which have been measured and found in the file are analyzed. There are special headers for symbols with which the symbol is defined. The number and appearance of the various symbols is not fixed, and can be updated. Special symbols (subsequently explained) require special routines. As indicated in block 176, the next step is to analyze trees and hedges. There are special routines available to draw various trees with various leaves and to draw various hedges. Both types of symbols are very important for various analyses with respect to determining what is in the line of sight of a witness or driver of a vehicle. The trees are shown and defined in such a way that the user can set the degree of visibility of or even through a tree or a hedge from the viewpoint of a witness or driver. Even the height of the tree trunk and other features of the tree can be defined.

As indicated in block 178, the next step is to add vehicles to the reconstructed representation of the accident scene. Dimensions of most vehicles are stored in the data library. Every automobile is modeled as a real three-dimensional symbol with it's original scale, which provides an almost perfect and realistic impression of the scene to the user. Because the exact dimensions of nearly any vehicle are known, the car is placed in the reconstructed accident scene exactly there where the centers of its wheels were previously measured using GPS receiver-pole 41. Furthermore, the car is perfectly positioned on the surface of the road/ground, which has been calculated in three dimensions by means of the triangulation process.

As indicated in block 180, the next step is to add special symbols. There are special and predefined symbols available from the data library for persons, parts of persons, traffic lights etc. These symbols are modeled as three-dimensional symbols, which provides the investigator with the ability to rotate the representation of the reconstructed accident scene on the screen of computer 17 so that the virtual impression of the entire accident appears to be very realistic. As indicated in block 182, the next step in the reconstruction process is to add legends to the symbols, wherein every symbol has a legend which the user can edit with comments during the GPS measurement at the accident site. The comments then are added to the reconstructed representation of the accident scene as displayed on the screen of computer 17. The user can select either whether this legend should be shown with number references in a list and detailed numbers at every symbol or with detailed information next to the symbol. As indicated in block 184, the next step is to "redraw and finish" the reconstructed representation of accident scene, meaning that all "help drawings" in different "layers" are removed and the graphic representation is "redrawn" without them. For example, the triangulation triangles are removed.

Figure 9:
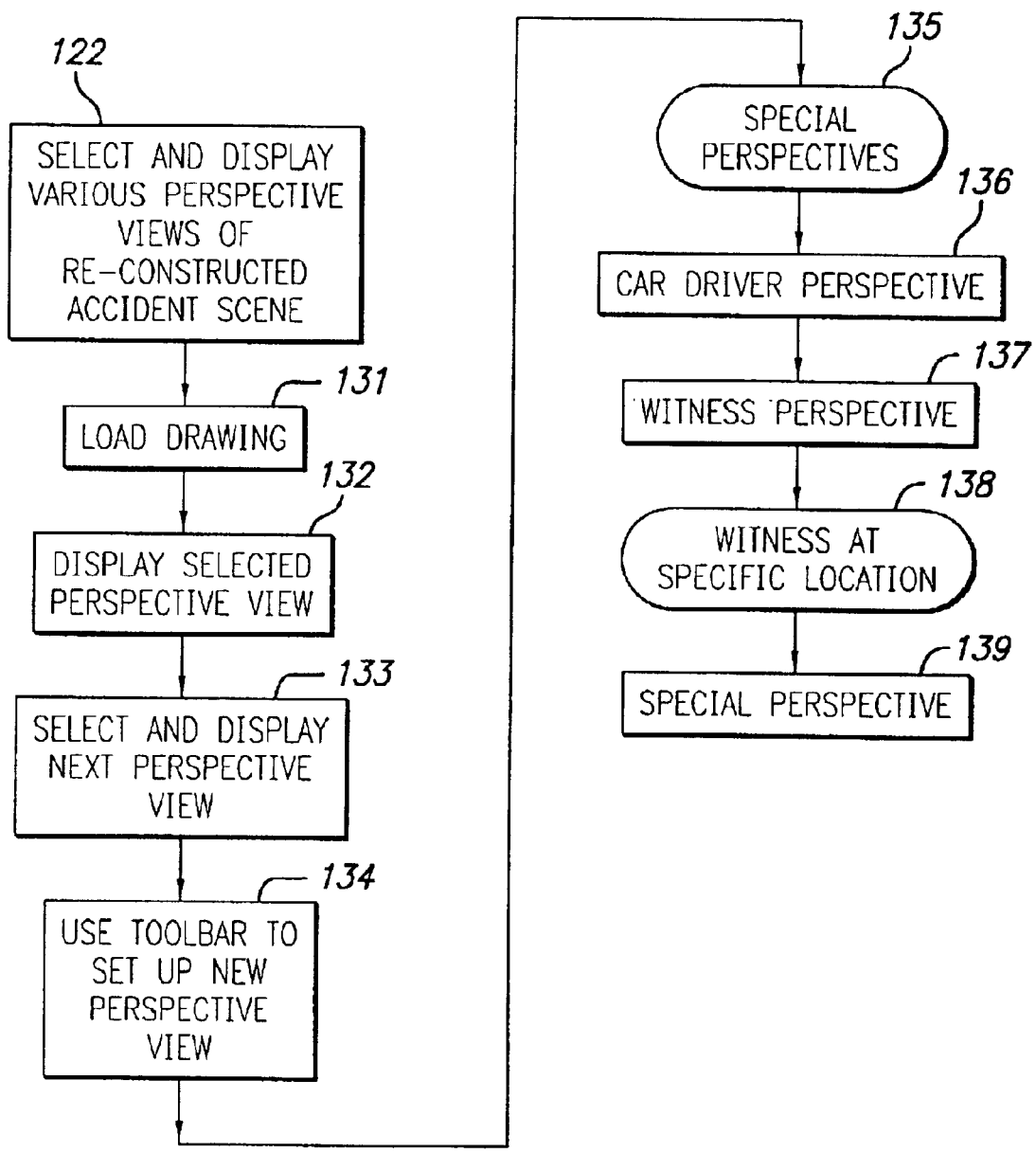
FIG. 9 is a flow chart of a "select perspective view" program executed in block 122 of FIG. 7B to select a perspective view of the accident scene in the selected direction from a selected vantage point.

FIG. 9 constitutes a "select and display perspective view" program executed by computer 17 to display the accident scene in a selected direction from a selected vantage point.

Referring to FIG. 9, the "select and display perspective view" program executed by computer 17 to display the accident scene in a particular direction from a particular vantage point is entered at block 122, to allow a very accurate, realistic graphic representation the accident scene based upon the accurate GPS data to be visualized from any perspective chosen by the investigator. The first step is to load the measurement file of the accident site into the accident scene reconstruction and display software into computer 17, as indicated in block 131. The data with the GPS data coordinates is computed using the well-known triangulation method mentioned above referenced block 172 of FIG. 8B to visualize the perspective graphic reconstruction of the accident scene on the screen of computer 17.

As indicated in block 132, a first view of the reconstructed accident scene is provided by the software from a selected vantage point above the accident site in a direction toward the center thereof. This provides the user an overview from above the accident site. The investigator then can zoom into the reconstructed image of the accident scene to examine details as desired, and can change the view by selecting various perspectives in various directions from various vantage points, as indicated in block 133.

To change perspectives, a special toolbar is displayed which provides powerful tools to give the user various views of the accident scene, as indicated in block 134. The user always has to set the direction from the desired vantage point to the point which he/she wishes to closely observe. This can be accomplished by clicking a mouse with the cursor suitably positioned on the display screen, or by manual keyboard entry of specific point coordinates. The investigator also can advance the "select and display perspective view" program in block 134 to set up a new perspective. The various special perspectives are possible from predefined points of interest, especially perspectives from the point of view of the vehicle driver as indicated in block 136, or a passenger or a witness, as indicated in block 137, for the purpose of accurate analysis of the accident.

The position of a witness within the accident scene will have been previously measured, and the various witnesses can be "classified" with respect to their direction of sight, visual range, visual acuity, and personal height, as indicated in blocks 138 and 139. The direction of sight of the witness can be indicated by, for example, red lines in the displayed reconstructed image of the accident site. Changes to the "characteristics" of the witness can be shown immediately in the image. After "defining" the witness, a mouse click on the witness results in a display of the accident scene from the perspective of that witness. The resulting perspective includes a realistic three-dimensional representation of all related buildings, trees, hedges or other environmental things in view of the witness. The effects of movement of the head of the witness can be accounted for, and the effects of additional light, fault, or other environmental influences can be added as desired.

To summarize, the invention provides the system and method wherein an investigator uses GPS receiver-pole 41 to measure the 3-dimensional coordinates of those locations and then record items of evidence and their locations at an accident site. Using a display produced by execution of a computer program, the investigator selects the type of evidence from a "evidence specifier", which is an item in one of the initial menus. There the user can select among different evidence items he wants to measure. The investigator then is prompted by the display of computer 14 precisely as to where to position the lower end of GPS receiver-pole 41 by the prompting program. It provides a graphic representation on the display of computer 14 to enable GPS receiver-pole 41 to determine the exact three-dimensional coordinates of the subject position point of the selected evidence item. The visual prompting on the display of computer 14 can be supplemented or even replaced by audible voice output by the voice output module included in a typical PDA or laptop computer. The 3-dimensional coordinates determined with the GPS receiver-pole 41 are transferred to computer 14, corrected, and written into memory card 15.

Using realistic predefined graphic representations of various items retrieved from the stored library in conjunction with corresponding GPS data, the graphic representations of the items of evidence are displayed in their actual positions relative to each other. The positions of the measured items are shown continuously, so the user immediately can see the result of the measurement in a real, in at least two dimensions on a PDA, or three dimensions on the display of a more powerful laptop computer or desktop computer or the like. In any case, the investigator can zoom and resize the screen image at any time as the "building" of the reconstructed graphic representation of the accident site progresses.

The investigator repeats the foregoing position point measurement/recording procedure in sequential order for each item indicated by the display of computer 14 as the prompting program is executed, until the x,y,z coordinates of all relevant position points of all items of interest at the accident site have been measured using GPS receiver-pole 41 and stored in memory card 15.

As indicated above, the known prior GPS solutions are unduly expensive, and the user has to have detailed knowledge of the GPS system and how to measure GPS points, and only experts in GPS measurements are able to perform these measurements. Because of the format of the GPS data for such prior systems, special software is necessary to convert the GPS data into coordinates that can be used to measure features of roads and other traffic items. These difficulties are avoided when using the present invention, wherein the above described system provides an easy-to-use tool for applying GPS technology to the collection of accurate data from the accident scene without the requirement that the investigator be a GPS expert. During all required measurements, the user is guided by easy-to-follow instructions.

The invention allows the evidence of an accident to be recorded on-site in the shortest amount of time, with optimum precision, by a single person holding GPS receiver-pole 41 to or on the position points to which the investigator is prompted. Often, only a few minutes are required for investigator to measure and record of the position points required for a particular accident site. This is in sharp contrast to the 1 to 2 hours often required to make the physical measurements using the conventional manual accident measuring and recording methods, for example by using a measuring tape or a stationary unit using laser or light beams to measure distance to a prism that is moved around the accident scene, and minimizes the amount of time that the roadway is blocked to normal traffic.

Another advantage of the invention is the fact that the recording of 3-dimensional coordinates in relation to one another using the above described technique provides precise data that can be easily used to reconstruct a computer-assisted 3-dimensional reconstruction of the actual situation at the accident site, so the investigator can be certain that all possible relevant evidence items and their respective positions have been timely measured and recorded and that nothing has been forgotten. Furthermore, the x and y resolution actually achieved using the present invention is substantially better than 2 cm, and the z resolution is substantially better than 6 cm, which is substantially higher resolution that is required to provide very accurate graphical reconstruction of accident site immediately after the accident.

Another advantage of the invention is that the investigator is guided through the steps of recording an accident in a way that allows persons with relatively little specialized training to use mobile accident recording system 40 correctly and effectively. Furthermore, after a position point is measured and recorded, a "plausibility" check can be carried out to ascertain if the recorded 3-dimensional coordinates can actually belong to that position. Also, multiple investigators can use mobile accident recording system 1 to measure and record different items of evidence which can later be used to graphically reconstruct the accident site from the recorded GPS position point data and the database library.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention. For example, a speech producing module and/or a speech recording device can be included in computer 14, and using the speech recording device, the investigator can enter direct voice comments pertaining to a measured point into the same file in which the corresponding GPS data is stored. A speech producing module can supplement and/or replace the prompting by the display associated with computer 14. This is may be important, for example, if the investigator does not wish to carry separate paper on which to make handwritten notes. Although it is necessary that GPS antenna 4 and at least part of the tilt correction circuitry 20 be mounted in fixed relation to pole 2, it is not necessary that the GPS receiver 8A or computer 14 be mounted in fixed relation to pole 2; GPS receiver 8A and/or computer 17 could be carried directly by the investigator or by another person. It is not essential that GPS receiver-pole 41 be carried directly by a person; instead, it could be carried by a controlled vehicle. Some of the components other than GPS antenna 4 and the accelerometers and electronic compass of tilt correction circuitry do not need to be mounted in fixed relation to pole 2 and can be carried elsewhere. Some of the electronic components could be mounted within rather than on pole 2. It is not essential that the axle of wheel 11 be located on the longitudinal axis of pole 2; the axle of wheel 11 instead can be offset ahead of or behind the longitudinal axis of pole 2. In this case, the tilt-corrected GPS coordinates represent the precise locations of the intersection points of the longitudinal axis of pole 2 with the feature along which wheel 11 is rolling. Such intersection points can be indicated by any suitable pointer attached to pole 2.

What is claimed is:

1. A system for receiving and recording data representing three-dimensional coordinates of selected points of objects at an accident site, comprising:
   (a) a positioning signal receiving unit;
   (b) a first computer and a link coupling the first computer to the positioning signal receiving unit; and
   (c) a prompting program stored in the first computer for causing a module associated with the first computer to prompt a user to sequentially position the signal positioning receiving unit in close spatial relationship with a plurality of points of each of a plurality of items or features at the accident site and to cause corresponding positioning signal unit coordinate data produced by the positioning signal receiving unit to be stored in a memory associated with the first computer, wherein the first computer stores a library of data representing graphic images of various items and features at the accident site, the first computer also executing a program that generates a simplified graphic reconstruction of the accident scene from the stored positioning signal receiving unit data and corresponding simplified graphic images retrieved from the library data in the first computer on a real-time basis as the various items and features at the accident site are measured and stored in the memory.

2. The system of claim 1 wherein the module includes one of a display module and a voice module.

3. The system of claim 1 wherein the GPS device includes the first computer.

4. The system of claim 1 wherein the graphic images are two-dimensional simplified graphic images, and the first computer displays the two-dimensional simplified graphic images on the display at locations determined by measured and stored coordinates of the corresponding items and features, respectively.

5. A system for receiving and recording data representing three-dimensional coordinates of selected points of objects at an accident site, comprising:
   (a) a GPS unit;
   (b) a first computer and a link coupling the first computer to the GPS unit;
   (c) a prompting program stored in the first computer for causing a display associated with the first computer to prompt a user to sequentially position the GPS unit in close spatial relationship with a plurality of points of each of a plurality of items or features at the accident site and to cause corresponding GPS coordinate data produced by the GPS unit to be stored in a memory associated with the first computer; and
   (d) a second computer storing a library of data representing realistic graphic images of various items and features at the accident site, the second computer also executing an accident scene reconstruction program that generates a realistic graphic representation of the accident scene from the GPS coordinate data and corresponding realistic graphic images from the library of data representing realistic graphic images.

6. The system of claim 5 wherein the reconstruction program
   i. displays line representations of the various features and items on a display associated with the second computer, wherein the line representations include lines extending between various points representing the GPS coordinate data for the various features and items, respectively; and
   ii. associates the displayed line representations of the various features and items with stored corresponding realistic graphic images of the various features and items, respectively.

7. The system of claim 6 wherein the reconstruction program prompts a user to select desired characteristics of the associated corresponding realistic graphic images.

8. The system of claim 5 wherein the second computer executes a program to produce the realistic graphic representation of the accident site from a selected vantage point in a selected direction.

9. The system of claim 8 wherein the second computer is included in the first computer.

10. A system for receiving and recording data representing three-dimensional coordinates of selected points of objects at an accident site, comprising:
    (a) a GPS receiver unit and a member supporting at least a GPS antenna of the GPS receiver unit;
    (b) a first computer supported by the member and a link coupling the first computer to the GPS receiver unit; and
    (c) a prompting program stored in the first computer for causing a display associated with the first computer to prompt a user to sequentially position a selected part of the member in close spatial relationship with a plurality of points of each of a plurality of items or features at the accident site and to cause corresponding GPS coordinate data produced by the GPS receiver unit to be stored in a memory associated with the first computer, wherein the first computer stores a library of data representing graphic images of various items and features at the accident site, the first computer also executing a program that generates a graphic reconstruction of the accident scene from the stored GPS data and corresponding graphic images retrieved from the library data in the first computer on a real-time basis as the various items and features at the accident site are measured and stored in the memory.

11. The system of claim 10 wherein the graphic images are two-dimensional simplified graphic images, and the first computer displays the two-dimensional simplified graphic images on the display at locations determined by measured and stored coordinates of the corresponding items and features, respectively.

12. A system for receiving and recording data representing three-dimensional coordinates of selected points of objects at an accident site, comprising:
(a) a GPS receiver unit and a member supporting at least a GPS antenna of the GPS receiver unit;
(b) a first computer supported by the member and a link coupling the first computer to the GPS receiver unit;
(c) a prompting program stored in the first computer for causing a display associated with the first computer to prompt a user to sequentially position a selected part of the member in close spatial relationship with a plurality of points of each of a plurality of items or features at the accident site and to cause corresponding GPS coordinate data produced by the GPS receiver unit to be stored in a memory associated with the first computer; and
(d) a tilt correction system at least a portion of which is attached in fixed relation to the member for producing correction signals representative of tilt of the member relative to the direction of gravitational force at the accident site and correcting the GPS coordinate data produced by the GPS receiver unit to produce tilt-corrected x,y,z coordinate data that precisely represent the locations of the selected part when it is positioned in the close spatial relationship with the plurality of points, respectively.

13. The system of claim 12 wherein the tilt correction system includes an accelerometer system attached in fixed relation to the member, and an electronic compass attached in fixed relation to the member for producing signals representative of the inclination of the member in two directions relative to the gravitational force.

14. The system of claim 13 wherein the tilt correction system includes a processor programmed to compute the signals representative of the inclination of the pole relative to the gravitational force in response to signals produced by the accelerometer system and signals produced by the electronic compass, and the first computer receives the signals representative of the inclination of the member relative to the gravitational force and the GPS coordinate data produced by the GPS receiver unit and corrects the GPS coordinate data produced by the GPS receiver unit in response to the signals representative of the inclination of the member relative to the gravitational force.

15. The system of claim 13 wherein the accelerometer system includes first and second accelerometers attached in fixed relationship to the member, the first accelerometer being inclined at a predetermined angle relative to the second accelerometer.

16. A system for receiving and recording data representing three-dimensional coordinates of selected points of objects at an accident site, comprising:
(a) a GPS receiver unit and a member supporting at least a GPS antenna of the GPS receiver unit;
(b) a first computer supported by the member and a link coupling the first computer to the GPS receiver unit;
(c) a prompting program stored in the first computer for causing a display associated with the first computer to prompt a user to sequentially position a selected part of the member in close spatial relationship with a plurality of points of each of a plurality of items or features at the accident site and to cause corresponding GPS coordinate data produced by the GPS receiver unit to be stored in a memory associated with the first computer; and
(d) a second computer storing a library of data representing realistic graphic images of various items and features at the accident site, the second computer also executing an accident scene reconstruction program that generates a realistic graphic representation of the accident scene from the GPS cornet data and corresponding realistic graphic images from the library of data representing realistic graphic images.

17. The system of claim 16 wherein the reconstruction program
i. displays line representations of the various features and items on a display associated with the second computer, wherein the line representations include lines extending between various points representing the GPS coordinate data for the various features and items, respectively; and
ii. associates the displayed line representations of the various features and items with stored corresponding realistic graphic images of the various features and items, respectively.

18. The system of claim 17 wherein the reconstruction program prompts a user to select desired characteristics of the associated corresponding realistic graphic images.

19. The system of claim 18 wherein the second computer executes a program that causes the second computer to produce and display the realistic graphic representation of the accident site from a selected vantage point in a selected direction.

20. The system of claim 16 wherein the first computer is included in the second computer.

21. The system of claim 16 wherein the second computer is separate from the first computer and is coupled to the first computer by a communications link.

22. The system of claim 10 wherein the member is a pole, and wherein at least an antenna of the GPS unit is supported at a top end of the member and the selected part is located at a lower end of the member.

23. The system of claim 22 wherein the selected part includes a pointed tip located at the lower end of the member.

24. The system of claim 22 wherein the selected part includes a wheel assembly removably attached to the lower end of the member.

25. The system of claim 24 wherein the first computer executes a recalibration program each time the wheel assembly is attached to or removed from a lower end of the member in order to compensate a resulting increase or decrease in a total effective length of the member with or without the wheel assembly.

26. The system of claim 22 wherein the member is a pole that is approximately six feet long.

27. The system of claim 13 wherein the tilt sensing device produces tilt signals representative of deviations of a longitudinal axis of the member from the direction of gravitational force at the accident site.

28. The system of claim 10 wherein the link is wireless.

29. The system of claim 10 wherein the link is conductive.

30. A method for receiving and recording data representing three-dimensional coordinates of selected points of objects at an accident site, comprising:
   (a) providing a GPS unit and a first computer;
   (b) communicating data produced by the GPS unit to the first computer;
   (c) prompting a user by means of a module associated with the first computer to sequentially position the GPS unit in close spatial relationship with a plurality of points of each of a plurality of items or features at the accident site and to cause coordinate data produced by the GPS unit representing coordinates of the plurality of points to be stored in a memory associated with the first computer by causing the first computer to execute a prompting program; and
   (d) storing a library of data representing graphic images of various items and features at the accident site, the method also including executing a program that generates a real-time graphic reconstruction of the accident scene from the stored coordinate data produced by the GPS unit and corresponding graphic images from the library data on a real-time basis as the various items and features at the accident site are measured and stored.

31. The method of claim 30 wherein the graphic images are two-dimensional simplified graphic images, the method including displaying the two-dimensional simplified graphic images at coordinate locations determined by measured and stored coordinates of the corresponding items and features, respectively.

32. A method for receiving and recording data representing three-dimensional coordinates of selected points of objects at an accident site, comprising:
   (a) providing a GPS unit and a first computer;
   (b) communicating data produced by the GPS unit to the first computer;
   (c) prompting a user by means of a module associated with the first computer to sequentially position the GPS unit in close spatial relationship with a plurality of points of each of a plurality of items or features at the accident site and to cause coordinate data produced by the GPS unit representing coordinates of the plurality of points to be stored in a memory associated with the first computer by causing the first computer to execute a prompting program; and
   (d) storing library data representing realistic graphic images of various items and features at the accident site, and executing an accident scene reconstruction program so as to generate a realistic graphic representation of the accident scene from the coordinate data produced by the GPS unit and corresponding selected graphic images from the library data.

33. The method of claim 32 including executing the reconstruction program by
   i. displaying line representations of the various features and items on a display associated with a second computer, wherein the line representations include lines extending between various points representing the coordinate data produced by the GPS unit for the various features and items, respectively; and
   ii. associating the displayed line representations of the various features and items with stored corresponding realistic graphic images of the various features and items, respectively.

34. The method of claim 33 wherein executing the reconstruction program includes prompting a user to select desired characteristics of the associated corresponding realistic graphic images.

35. A method for receiving and recording data representing three dimensional coordinates of selected points of objects at an accident site, comprising:
   (a) supporting at least a GPS antenna of a GPS receiver unit on an upper end portion of a pole, and providing a measurement point tracking device in fixed relation to a lower end portion of the pole;
   (b) communicating data produced by the GPS receiver unit to a first computer; and
   (c) prompting a user by means of a module associated with the first computer to sequentially position the tracking device in close spatial relationship with a plurality of points of each of a plurality of items or features at the accident site and to cause coordinate data produced by the GPS receiver unit representing coordinates of the plurality of points to be stored in a memory associated with the first computer by causing the first computer to execute a promoting program wherein the prompting includes prompting a user to place a wheel assembly on the lower end portion of the pole and then roll a wheel of the wheel assembly along a particular mark or feature at the accident site, as the GPS receiver unit repetitively produces data representing coordinates representing successive locations of the bottom of the wheel.

36. A method for receiving and recording data representing three dimensional coordinates of selected points of objects at an accident site, comprising:
   (a) supporting at least a GPS antenna of a GPS receiver unit on an upper end portion of a pole, and providing a measurement point tracking device in fixed relation to a lower end portion of the pole;
   (b) communicating data produced by the GPS receiver unit to a first computer;
   (c) prompting a user by means of a module associated with the first computer to sequentially position the tracking device in close spatial relationship with a plurality of points of each of a plurality of items or features at the accident site and to cause coordinate data produced by the GPS receiver unit representing coordinates of the plurality of points to be stored in a memory associated with the first computer by causing the first computer to execute a prompting program; and
   (d) operating a tilt correction system at least part of which is attached in fixed relation to the pole to produce correction signals representative of tilt of the pole relative to the direction of gravitational force at the accident site and utilizing the correction signals to correct the coordinate data produced by the GPS receiver unit in order to produce x,y,z coordinate data that precisely represents the locations of the points.

37. A method for receiving and recording data representing three dimensional coordinates of selected points of objects at an accident site, comprising:
   (a) supporting at least a GPS antenna of a GPS receiver unit on an upper end portion of a pole, and providing a measurement point tracking device in fixed relation to a lower end portion of the pole;
   (b) communicating data produced by the GPS receiver unit to a first computer;
   (c) prompting a user by means of a module associated with the first computer to sequentially position the tracking device in close spatial relationship with a plurality of points of each of a plurality of items or features at the accident site and to cause coordinate data produced by the GPS receiver unit representing coordinates of the plurality of points to be stored in a memory associated with the first computer by causing the first computer to execute a prompting program;

(d) storing library data representing realistic graphic images of various items and features at the accident site; and (e) executing an accident scene reconstruction program so as to generate a realistic graphic representation of the accident site from the stored coordinate data and corresponding selected graphic images from the library data.

38. The method of claim 37 including executing the reconstruction program by i. displaying line representations of the various features and items on a display associated with the second computer, wherein the line representations include lines extending between various points representing the coordinate data produced by the GPS receiver unit for the various features and items, respectively; and ii. associating the displayed line representations of the various features and items with stored corresponding realistic graphic images of the various features and items, respectively.

39. The method of claim 38 including operating the second computer to execute a perspective selection program so as to produce the realistic graphic representation of the accident site from a selected vantage point in a selected direction.

40. The method of claim 39 wherein operating the second computer to execute the perspective selection program includes displaying a panel prompting a user to select the vantage point and direction.

41. A method for receiving and recording data representing three dimensional coordinates of selected points of objects at an accident site, comprising:

(a) supporting at least a GPS antenna of a GPS receiver unit on an upper end portion of a pole, and providing a measurement point tracking device in fixed relation to a lower end portion of the pole;

(b) communicating data produced by the GPS receiver unit to a first computer;

(c) prompting a user by means of a module associated with the first computer to sequentially position the tracking device in close spatial relationship with a plurality of points of each of a plurality of items or features at the accident site and to cause coordinate data produced by the GPS receiver unit representing coordinates of the plurality of points to be stored in a memory associated with the first computer by causing the first computer to execute a prompting program; and (d) providing a wheel assembly removably attached to the lower end of the pole and operating the GPS receiver unit and the first computer in a continuous mode to repetitively measure stored coordinate data corresponding to the location of the contact point of the wheel with a feature of the accident site being measured at predetermined time intervals.

42. The method of claim 41 including executing a recalibration program each time the wheel assembly is attached to or removed from a lower end of the pole in order to compensate a resulting increase or decrease in the total effective length of the pole.

43. A tilt correction system for converting coordinate data produced by a GPS receiver in response to GPS signals received by a GPS antenna supported in fixed relation to a first point along a longitudinal axis of a member, comprising:

(a) a tilt sensing system at least part of which is attached in fixed relation to the member, the tilt sensing system producing correction signals representative of inclination of the member relative to the direction of gravitational force; and (b) a computing device coupled to receive the correction signals from the tilt sensing system and coordinate data produced by the GPS receiver, the computing device being operative to correct the coordinate data in response to the correction signals to produce tilt-corrected coordinate data representing coordinates of a second point located in fixed relation to a predetermined point located on the longitudinal axis a predetermined distance from the first point.

44. The tilt correction system of claim 43 wherein the first point is located at an upper portion of the member and the second point is located on the longitudinal axis at a lower portion of the member.

45. The tilt correction system of claim 43 wherein the tilt sensing system includes an accelerometer system attached in fixed relation to the member and an electronic compass attached in fixed relation to the member for producing signals representative of the inclination of the member in two directions relative to the gravitational force.

46. The tilt correction system of claim 45 including a processor programmed to compute the correction signals representative of the inclination of the member relative to the gravitational force in response to signals produced by the accelerometer system and signals produced by the electronic compass, wherein the computing device receives the correction signals representative of the inclination of the member relative to the gravitational force and the coordinate data produced by the GPS receiver and corrects the coordinate data produced by the GPS receiver in response to the signals representative of the inclination of the member relative to the gravitational force.

47. The system of claim 45 wherein the accelerometer system includes first and second accelerometers attached in fixed relationship to the member, the first accelerometer being inclined at a predetermined angle relative to the second accelerometer.

48. A GPS receiver-pole for receiving and recording data representing three-dimensional coordinates of selected points of objects at an accident site, comprising:

(a) a GPS receiver unit and a pole supporting at least antenna coupled to a GPS receiver unit;

(b) a computer and a link coupling the computer to the GPS receiver;

(c) a prompting program stored in the computer for causing a module associated with the computer to prompt a user to sequentially position a selected part of the pole in close spatial relationship with a plurality of points of each of a plurality of items or features at the accident site and to cause coordinate data produced by the GPS receiver unit to be stored in a memory associated with the computer; and (d) a tilt correction system for producing correction signals representative of tilt of the member relative to the direction of gravitational force at the accident site and correcting the coordinate data produced by the GPS receiver unit to produce x,y,z coordinates signals that precisely represent the location of selected part when it is positioned in the close spatial relationship with the plurality of points, respectively.

49. The GPS receiver-pole of claim 48 wherein the tilt correction system includes an accelerometer attached in fixed relation to the pole and an electronic compass attached in fixed relation to the pole for producing signals representative of the inclination of the pole in two directions relative to the gravitational force.

50. The GPS receiver-pole of claim 48 wherein the selected part includes a pointed tip located at a lower end portion of the pole.

51. The GPS receiver-pole of claim 48 wherein the selected part includes a wheel assembly removably attached to a lower end portion of the pole and wherein the first computer executes a recalibration program each time the wheel assembly is attached to or removed from the lower end portion of the pole in order to compensate a resulting increase or decrease in the total effective length of the pole.

52. The system of claim 48 wherein the pole is approximately six feet long.

* * * * *